US009967538B2

United States Patent
Didyk et al.

(10) Patent No.: US 9,967,538 B2
(45) Date of Patent: May 8, 2018

(54) REDUCING VIEW TRANSITIONS ARTIFACTS IN AUTOMULTISCOPIC DISPLAYS

(71) Applicant: Massachusetts Institute of Technology, Cambridge, MA (US)

(72) Inventors: Piotr Krzysztof Didyk, Swiebodzice (PL); Song-Pei Du, Beijing (CN); Frederic Durand, Somerville, MA (US); Wojciech Matusik, Lexington, MA (US)

(73) Assignee: Massachussetts Institute of Technology, Cambridge, MA (US)

( * ) Notice: Subject to any disclaimer, the term of this patent is extended or adjusted under 35 U.S.C. 154(b) by 217 days.

(21) Appl. No.: 14/613,924

(22) Filed: Feb. 4, 2015

(65) Prior Publication Data

US 2015/0156470 A1     Jun. 4, 2015

Related U.S. Application Data

(63) Continuation-in-part of application No. 14/531,548, filed on Nov. 3, 2014.

(Continued)

(51) Int. Cl.
| | |
|---|---|
| *G06T 19/00* | (2011.01) |
| *H04N 13/00* | (2018.01) |
| *H04N 13/04* | (2006.01) |

(52) U.S. Cl.
CPC ..... *H04N 13/0018* (2013.01); *H04N 13/0402* (2013.01); *H04N 13/0445* (2013.01)

(58) Field of Classification Search
CPC ........... H04N 13/0445; H04N 13/0018; H04N 13/0402

(Continued)

(56) References Cited

U.S. PATENT DOCUMENTS

| 725,567 A | 4/1903 | Ives |
| 6,097,394 A * | 8/2000 | Levoy ................ G02B 27/2271 |
| | | 345/419 |

(Continued)

FOREIGN PATENT DOCUMENTS

| EP | 1 235 439 A2 | 8/2002 |
| EP | 2 323 416 A2 | 5/2011 |
| WO | WO 2015/120032 A1 | 8/2015 |

OTHER PUBLICATIONS

International Preliminary Report on Patentability of PCT/US2015/014434, "Reducing View Transitions Artifacts in Automultiscopic Displays," dated Aug. 9, 2016.

(Continued)

*Primary Examiner* — Chante Harrison
(74) *Attorney, Agent, or Firm* — Hamilton, Brook, Smith & Reynolds, P.C.

(57) ABSTRACT

Automultiscopic displays enable glasses-free 3D viewing by providing both binocular and motion parallax. Within the display field of view, different images are observed depending on the viewing direction. When moving outside the field of view, the observed images may repeat. Light fields produced by lenticular and parallax-barrier automultiscopic displays may have repetitive structure with significant discontinuities between the fields of view. This repetitive structure induces visual artifacts in the form of view discontinuities, depth reversals, and extensive disparities. To overcome this problem, a method modifies the presented light field image content and makes it more repetitive. In the method, a light field is refined using global and local shearing and then the repeating fragments are stitched. The method reduces the discontinuities in the displayed light field and leads to visual quality improvements. Benefits of (Continued)

the method are shown using an automultiscopic display with a parallax barrier and lenticular prints.

**18 Claims, 27 Drawing Sheets
(12 of 27 Drawing Sheet(s) Filed in Color)**

Related U.S. Application Data

(60) Provisional application No. 61/937,371, filed on Feb. 7, 2014, provisional application No. 61/899,595, filed on Nov. 4, 2013.

(58) Field of Classification Search
USPC ........ 345/419, 629, 672; 382/154, 254, 275; 348/42–60; 359/455, 471, 473, 476, 466, 359/23
See application file for complete search history.

(56) References Cited

U.S. PATENT DOCUMENTS

| | | | |
|---|---|---|---|
| 7,839,549 B2 | 11/2010 | Mihajlovic | |
| 8,624,964 B2 | 1/2014 | Barenbrug | |
| 9,113,043 B1 | 8/2015 | Kim et al. | |
| 9,316,840 B2* | 4/2016 | Georgiev | G02B 27/1066 |
| 9,412,172 B2* | 8/2016 | Sorkine-Hornung | G06T 5/00 |
| 9,497,380 B1* | 11/2016 | Jannard | H04N 5/23238 |
| 9,712,810 B2* | 7/2017 | Smithwick | H04N 13/0404 |
| 9,756,316 B2 | 9/2017 | Didyk et al. | |
| 2004/0233275 A1 | 11/2004 | Tomita | |
| 2006/0290777 A1 | 12/2006 | Iwamoto et al. | |
| 2007/0229653 A1 | 10/2007 | Matusik et al. | |
| 2007/0285554 A1* | 12/2007 | Givon | G03H 1/268 348/340 |
| 2008/0043095 A1* | 2/2008 | Vetro | H04N 13/0011 348/51 |
| 2008/0252638 A1 | 10/2008 | Riemens et al. | |
| 2008/0291268 A1 | 11/2008 | Berretty | |
| 2009/0262181 A1 | 10/2009 | Rotem et al. | |
| 2010/0134599 A1 | 6/2010 | Billert et al. | |
| 2010/0302235 A1 | 12/2010 | Darshan et al. | |
| 2011/0032587 A1 | 2/2011 | Bjelkhagen et al. | |
| 2011/0102423 A1 | 5/2011 | Nam et al. | |
| 2011/0109629 A1 | 5/2011 | Ericson et al. | |
| 2011/0304708 A1 | 12/2011 | Ignatov | |
| 2012/0013651 A1 | 1/2012 | Trayner et al. | |
| 2012/0176473 A1* | 7/2012 | Genova | H04N 13/0011 348/46 |
| 2013/0002816 A1 | 1/2013 | Hannuksela et al. | |
| 2013/0278727 A1* | 10/2013 | Tamir | H04N 13/0048 348/47 |
| 2013/0286170 A1 | 10/2013 | Qin et al. | |
| 2014/0072228 A1 | 3/2014 | Rubinstein et al. | |
| 2014/0072229 A1 | 3/2014 | Wadhwa et al. | |
| 2014/0285623 A1 | 9/2014 | Bruls | |
| 2015/0042770 A1 | 2/2015 | Barenbrug et al. | |
| 2015/0071360 A1 | 3/2015 | Nguyen et al. | |
| 2015/0124062 A1 | 5/2015 | Didyk et al. | |
| 2015/0131924 A1* | 5/2015 | He | G06T 3/0018 382/284 |
| 2015/0319423 A1* | 11/2015 | Kim | H04N 13/02 348/43 |

OTHER PUBLICATIONS

Agarwala, A., Zheng, K. C., Pal, C., Agrawala, M., Cohen, M., Curless, B., Salesin, D., and Szeliski, R., "Panoramic Video Textures," in *ACM Trans. Graph.*, (TOG), 24, 821-827, downloaded from http://grail.cs.washington.edu/projects/panovidtex/panovidtex.pdf, available as of May 2005.

Agarwala, A., "Efficient Gradient-Domain Compositing Using Quadtrees," in *ACM Trans. Graph*, (TOG), 26, Article No. 94, downloaded from http://www.agarwala.org/efficient_gdc/preprint.pdf, available as of May 2007.

Birklbauer, C., and Bimber, O., "Light-Field Retargeting," Wiley Online Library, *Computer Graphics Forum*, 31, 295-303, May 2012.

Chen, B., Ofek, E., Shum, H.-Y., and Levoy, M., "Interactive Deformation of Light Fields," in *ACM Proceedings of the 2005, Symposium on Interactive 3D Graphics and Games (I3D) 2005 conference proceedings*, 367, 139-146, downloaded from https://graphics.stanford.edu/papers/interactive_deformation_lfs/interactive_deformation.pdf, available as of Mar. 2005.

Didyk, P., Ritschel, T., Eisemann, E., Myszkowski, K., Seidel, H.-P., and Matusik, W., "A Luminance-Contrast-Aware Disparity Model and Applications," *ACM Trans. Graph. (Proc. SIGGRAPH Asia)*, 31, 6, 184:1-184:10, Nov. 2012.

Didyk, P., Sitthi-Amorn, P., Freeman, W., Durand, F., and Matusik, W., "Joint View Expansion and Filtering for Automultiscopic 3D Displays," *ACM Trans. Graph.*, 32, 6, 221:1-221:8, Nov. 2013.

Eisemann, M., Gohlke, D., and Magnor, M., "Edge-Constrained Image Compositing," *Proceedings of Graphics Interface 2011, Canadian Human-Computer Communications Society*, 191-198, May 2011.

Filippini, H. R., and Banks, M. S., "Limits of stereopsis explained by local cross-correlation," *Journal of Vision* 9(1), 8, 1-18, Jan. 2009.

Hirsch, M., Wetzstein, G., and Raskar, R., "A Compressive Light Field Projection System," in *ACM Trans. Graph*. 33, 4, 1-12, downloaded from http://web.media.mit.edu/~gordonw/CompressiveLightFieldProjector/CompressiveLightFieldProjector.pdf, available as of May 2014.

Horn, D. R., and Chen, B., "Lightshop: Interactive Light Field Manipulation and Rendering," in *ACM Proceedings of the 200 Symposium on Interactive 3D Graphics and Games*, 121-383 128, downloaded from http://graphics.stanford.edu/papers/lightshop/lightshop.pdf, available as of Mar. 2007.

Isaksen, A., McMillan, L., and Gortler, S. J., "Dynamically Reparameterized Light Fields," in *Proceedings of the 27th Annual Conference on Computer Graphics and Interactive Techniques*, ACM Press/Addison-Wesley Publishing Co., 297-306, Jul. 2000.

Jia, J., and Tang, C.-K., "Image Stitching Using Structure Deformation," *IEEE Transactions on Pattern Analysis and Machine Intelligence*, 30, 4, 617-631, Apr. 2008.

Jia, J., Sun, J., Tang, C.-K., and Shum, H.-Y., "Drag-and-Drop Pasting," *ACM Transactions on Graphics* (TOG), 25, 631-636, Jul. 2006.

Kim, C., Hornung, A., Heinzle, S., Matusik, W., and Gross, M., "Multi-Perspective Stereoscopy from Light Fields," *ACM Trans. Graph*. 30, 6, 190, Dec. 2011.

Kim, C., Zimmer, H., Pritch, Y., Sorkine-Hornung, A., and Gross, M., "Scene Reconstruction from High Spatio-Angular Resolution Light Fields," *ACM Trans. Graph*. (*TOG*), 32, 4, Article No. 73, Jul. 2013.

Konrad, J., and Agniel, P., "Subsampling Models and Anti-Alias Filters for 3-D Automultiscopic Displays," *IEEE Transactions on Image Processing*, 15, 1, 128-140, Jan. 2006.

Kwatra, V., Schödl, A., Essa, I., Turk, G., and Bobick, A., "Graphcut Textures: Image and Video Synthesis Using Graph Cuts," *ACM Trans. Graph*. 22, 3, 277-286, Mar. 2002.

Levin, A., Zomet, A., Peleg, S., and Weiss, Y., "Seamless Image Stitching in the Gradient Domain," *Computer Vision-ECCV*, 3024, 377-389, May 2004.

Levoy, M., and Hanrahan, P., "Light Field Rendering," in *Proceedings of the 23rd Annual Conference on Computer Graphics and Interactive Techniques*, ACM, 31-42, Aug. 1996.

Lippmann, G., "Épreuves Réversibles Donnant La Sensation Du Relief," *Journal of Physics* 7, 4, 821-825, Nov. 1908.

Mahajan, D., Huang, F.-C., Matusik, W., Ramamoorthi, R., and Belhumeur, P., "Moving Gradients: A Path-Based Method for Plausible Image Interpolation," *ACM Trans. Graph*. 28, 3, 42, Aug. 2009.

(56) References Cited

OTHER PUBLICATIONS

Masia, B., Wetzstein, G., Aliaga, C., Raskar, R., and Gutierrez, D., "Display Adaptive 3D Content Remapping," *Computers & Graphics* 37, 8, 983-996, Jul. 2013.

Pérez, P., Gangnet, M., and Blake, A., "Poisson Image Editing," *ACM Trans. Graph.* 22, 3, 313-318, Jul. 2003.

Peterka, T., Kooima, R. L., Sandin, D. J., Johnson, A. E., Leigh, J., and Defanti, T. A., "Advances in the Dynallax Solid-State Dynamic Parallax Barrier Autostereoscopic Visualization Display System," *IEEE Transactions on Visualization and Computer Graphics* 14, 487-499, May-Jun. 2008.

Rubinstein, M., Shamir, A., and Avidan, S., "Improved Seam Carving for Video Retargeting," *ACM Trans. Graph.* 27, 3, 16:1-16:9, Aug. 2008.

Schödl, A., Szeliski, R., Salesin, D. H., and Essa, I., "Video Textures," *Annual Conference on Computer Graphics*, SIGGRAPH '00, 489-498, Jul. 2000.

Shibata, T., Kim J., Hoffman, D., and Banks, M., "The Zone of Comfort: Predicting Visual Discomfort with Stereo Displays," *Journal of Vision* 11, 8, 11:1-11:29, Jul. 2011.

Stewart, J., Yu, J., Gortler, S. J., and McMillan, L., "A New Reconstruction Filter for Undersampled Light Fields," in *Proceedings of the 14th Eurographics workshop on Rendering*, Eurographics Association, 150-156, downloaded from cs.harvard.edu/~sjg/papers/nrf.pdf, available as of Jun. 2003.

Tompkin, J., Heinzle, S. Kautz, J., and Matusik, W., "Content-Adaptive Lenticular Prints," *ACM Trans. Graph.* 32, 4, 133:1-133:10, Jul. 2013.

Ye, G., State, A., and Fuchs, H., "A Practical Multiviewer Tabletop Autostereoscopic Display," 2010 *9th IEEE International Symposium on Mixed and Augmented Reality (ISMAR)*, 147-156, Oct. 2010.

Yi, S.-Y., Chae and, H.-B., and Lee, S.-H., "Moving Parallax Barrier Design for Eye-Tracking Autostereoscopic Displays," *3DTV Conference: The True Vision—Capture, Transmission and Display of 3D Video*, May 2008.

Zhang, Z., Wang, L., Guo, B., and Shum, H.-Y., "Feature-Based Light Field Morphing," *ACM Trans. Graph.* 21, 3, 457-464, Jul. 2002.

Zwicker, M., Matusik, W., Durand, F., and Pfister, H., "Antialiasing for Automultiscopic 3D Displays," in *Proceedings of the 17th Eurographics Conference on Rendering Techniques*, Eurographics Association, 73-82, Jun. 2006.

Du, Song-Pei, Didyk, Piotr, Durand, Frédo, Hu, Shi-Min, and Matusik, Wojciech, "Improving Visual Quality of View Transitions in Automultiscopic Displays," *ACM Trans. Graph. (Proc. SIGGRAPH Asia)*, 33, 6, Article 192, Sep. 2014.

Brookes, A., and Stevens, K. A., "The Analogy Between Stereo Depth and Brightness," *Perception* 18, 5, 601-614, Feb. 1989.

"Applicants' Supplementary Video," retrieved from the Internet URL: http://people.csail.mit.edu/pdidyk/projects/MultiviewTransitions/MultiviewTransitions.avi, and also available at http://www.youtube.com/ under the title, "Improving Visual Quality of View Transitions in Automultiscopic Displays," Sep. 2014.

MERL, UCSD/MERL "Light Field Repository" downloaded from https://web.archive.org/web/20070630144440/http://graphics.ucsd.edu/datasets/lfarchive, available as of Jun. 2007.

Notification of Transmittal of the International Search Report and the Written Opinion of Tthe International Searching Authority, PCT/US2015/014434, "Reducing View Transitions Artifacts in Automultiscopic Displays," dated Apr. 28, 2015.

"Applicants' Video," Nov. 5, 2013, retrieved from the Internet URL: http://people.csail.mit.edu/pdidy/projects/MultiviewConversion/MultiviewConversion.mp4, and also available at http://www.youtube.com/ under the title "Joint View Expansion and Filtering for Automultiscopic 3D Displays.".

Akeley, K., Watt, S. J., Girshick, A. R., and Banks, M. S., "A Stereo Display Prototype with Multiple Focal Distances," *ACM Trans. Graph.*, 23, 3, Aug. 2004, p. 804-813.

Balogh, T., "The HoloVizio System," in *Electronic Imaging*, Jan. 2006, p. 60550U-1-60550U-12.

Brown, M. Z., Burschka, D., and Hager, G. D., "Advances in Computational Stereo," *IEEE Transactions on Pattern Analysis and Machine Intelligence*, 25, 8, Aug. 2003, p. 993-1008.

Chai, J. X., Tong, X., Chan, S. C., and Shum, H. Y., "Plenoptic Sampling," in *Proceedings of the 27th annual conference on Computer graphics and interactive techniques*, ACM Press/Addison-Wesley Publishing Co., Jul. 2000, p. 307-318.

Didyk, P., Ritschel, T., Eisemann, E., Myszkowski, K., and Seidel, H.-P., "Adaptive Image-space Stereo View Synthesis," in *Proc. VMV*, Nov. 2010, 8 pages.

Farre, M., Wang, O., Lang, M., Stefanoski, N., Hornung, A., and Smolic, A., "Automatic Content Creation for Multiview Autostereoscopic Displays Using Image Domain Warping," in *IEEE International Conference on Multimedia and Expo*, Jul. 2011, 6 pages.

Holliman, N. S., Dodgson, N. A., Favalora, G. E., and Pockett, L., "Three-Dimensional Displays: A Review and Applications Analysis," *IEEE Transactions on Broadcasting*, 57, 2, Jun. 2011, p. 362-371.

Hosni, A., Rhemann, C., Bleyer, M., Rother, C., and Gelautz, M., "Fast Cost-Volume Filtering for Visual Correspondence and Beyond," *IEEE Transactions on Pattern Analysis and Machine Intelligence*, 35, 2, Feb. 2013, p. 504-511.

Lambooij, M., Ijsselsteijn, W., Fortuin, M., and Heynderickx, I., "Visual Discomfort and Visual Fatigue of Stereoscopic Displays: A Review," *Journal of Imaging Science and Technology*, 53, May 2009, p. 030201-14.

Lang, M., Hornung, A., Wang, O., Poulakos, S., Smolic, A., and Gross, M., "Nonlinear Disparity Mapping for Stereoscopic 3D," *ACM Trans. Graph.*, 29, 4, Jul. 2010, p. 75:1-75:10.

Lipton, L., and Feldman, M. H., "New autostereoscopic display technology: The SynthaGram," in *Electronic Imaging*, International Society for Optics and Photonics, Jan. 2002, p. 229-235.

Liu, C., Torralba, A., Freeman, W. T., Durand, F., and Adelson, E. H., "Motion Magnification," *ACM Trans. Graph.*, 24, 3, Jul. 2005, 519-526.

Matusik, W., and Pfister, H., "3D TV: A Scalable System for Real-Time Acquisition, Transmission, and Autostereoscopic Display of Dynamic Scenes," *ACM Trans. Graph.*, 23, 3, Aug. 2004, p. 814-824.

Richardt, C., Stoll, C., Dodgson, N. A., Seidel, H.-P., and Theobalt, C., "Coherent Spatiotemporal Filtering, Upsampling and Rendering of RGBZ Videos," *Computer Graphics Forum (Proc. Eurographics)*, 31,2, May 2012, p. 247-256.

Schmidt, A., and Grasnick, A., "Multi-viewpoint Autostereoscopic Displays from 4D-Vision," in *Electronic Imaging*, May 2002 p. 212-221.

Simoncelli, E. P., and Freeman, W. T., "The Steerable Pyramid: A Flexible Architecture for Multi-Scale Derivative Computation," in *IEEE International Conference on Image Processing*, vol. 3, Oct. 1995, p. 444-447.

Simoncelli, E. P., Freeman, W. T., Adelson, E. H., and Heeger, D. J., "Shiftable Multiscale Transforms," *IEEE Transactions on Information Theory*, 38,2, Mar. 1992, p. 587-607.

Smolic, A., Muller, K., Dix, K., Merkle, P., Kauff, P., and Wiegand, T., "Intermediate View Interpolation Based on Multiview Video Plus Depth for Advanced 3D Video Systems," in *IEEE International Conference on Image Processing*, Oct. 2008, p. 2448-2451.

Takaki, Y., and Nago, N., "Multi-projection of lenticular displays to construct a 256-view super multi-view display," *Optics Express*, 18,9, Apr. 2010, p. 8824-8835.

Wadhwa, N., Rubinstein, M., Guttag, J., Durand, F., and Freeman, W. T., "Phase-Based Video Motion Processing," *ACM Trans. Graph. (Proc. SIGGRAPH)*, 32, 4, Jul. 2013, p. 80:1-80:9.

Wang, Z., Bovik, A. C., Sheikh, H. R., and Simoncelli, E. P., "Image Quality Assessment: From Error Visibility to Structural Similarity," *IEEE Transactions on Image Processing*, 13,4, Apr. 2004, p. 600-612.

(56) References Cited

OTHER PUBLICATIONS

Wetzstein, G., Lanman, D., Hirsch, M., and Raskar, R., "Tensor Displays: Compressive Light Field Synthesis using Multilayer Displays with Directional Backlighting," *ACM Trans. Graph. (Proc. SIGGRAPH)*, 31,4, Jul. 2012, p. 80:1-80:11.

Wilburn, B. S., Smulski, M., Lee, H. H. K., and Horowitz, M. A., "Light Field Video Camera," in *Electronic Imaging*, International Society for Optics and Photonics, Dec. 2001, p. 29-36.

Wu, H. Y., Rubinstein, M., Shih, E., Guttag, J., Durand, F., and Freeman, W. T., "Eulerian Video Magnification for Revealing Subtle Changes in the World, " *ACM Trans. Graph. (Proc. SIGGRAPH)* 31,4, Jul. 2012, p. 65:1-65:8.

"The Stanford Light Field Archive," [online] Jun. 2008. Retrieved from the Internet URL: hftp://lightfield.stanford.edu/lfs.html. 11 pages.

\* cited by examiner

REDUCING VIEW TRANSITIONS ARTIFACTS IN AUTOMULTISCOPIC DISPLAYS

RELATED APPLICATIONS

This application claims the benefit of U.S. Provisional Application No. 61/937,371, filed on Feb. 7, 2014, and is also a continuation-in-part of U.S. application Ser. No. 14/531,548, filed Nov. 3, 2014, which claims the benefit of U.S. Provisional Application No. 61/899,595, filed on Nov. 4, 2013. The entire teachings of the above applications are incorporated herein by reference in their entirety.

GOVERNMENT SUPPORT

This invention was made with Government support under Grant Nos. IIS-1111415 and IIS-1116296 awarded by the National Science Foundation. The Government has certain rights in the invention.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

Multi-view autostereoscopic (or automultiscopic) displays may provide an immersive, glasses-free three dimensional (3D) experience and therefore have the potential to become the future of television and cinema. Automultiscopic displays may reproduce both binocular and motion parallax cues. Such displays may show a different image depending on a viewer's position and/or direction. This is typically achieved by adding a parallax barrier (see, Ives, F. E., "Parallax Stereogram and Process of Making Same," U.S. Pat. No. 725,567, April 1903, which is incorporated by reference herein in its entirety) or a lenticular screen (see, Lippmann, G., "Épreuves Réversibles Donnant La Sensation Du Relief," *Journal of Physics* 7, 4, 821-825, November 1908, which is incorporated by reference herein in its entirety) on the top of a high-resolution display. Some of the spatial display resolution may be exchanged for angular resolution. This enables glasses-free 3D and provides motion parallax effect. However, due to the limited angular resolution of such displays, they suffer from view transitions, artifacts, and hot-spotting (e.g., image quality may be affected by the viewing position).

SUMMARY OF THE DISCLOSURE

Some embodiments may include a method, corresponding system, and corresponding apparatus that remedy the deficiencies of the above-mentioned existing approaches, including reducing (and/or eliminating) view transitions, artifacts, and/or hot spots.

Some embodiments may include a computer-implemented method that may comprise storing multi-view image content (including but not limited to one or more multi-view images) in an electronic memory. The method may also perform at least one of reducing and/or removing the visibility of one or more artifacts from the multi-view image content by modifying the multi-view image content. The method may modify the multi-view image content based upon at least one of: shearing the multi-view image content globally, shearing the multi-view image content locally, and/or stitching the multi-view image content. Based upon modification of the multi-view image, the method may provide one or more updated multi-view images with improved visibility as compared with the multi-view image content, at least with respect to the one or more artifacts.

In some embodiments of the method, shearing (globally and/or locally) of the multi-view image content may be performed in one or more primary domains and/or on one or more light fields (including but not limited to one or more light fields and/or one or more epipolar-plane images or EPIs) that may be associated with the multi-view image content. In some embodiments, stitching the multi-view image content may be performed in one or more gradient domains that may be associated with the multi-view image content.

In some embodiments, the method may further comprise modifying the multi-view image content based upon shearing the multi-view image content globally, shearing the multi-view image content locally, and stitching the multi-view image content. Shearing the multi-view image content globally may include repositioning a plurality of views of the multi-view image content.

In some embodiments of the method, in one or more EPIs (epipolar-plane images) of the multi-view image content, the depth of one or more scenes of the multi-view image content may be encoded by one or more slopes of one or more lines that may correspond to one or more points in the one or more scenes. In some embodiments, a perceived depth may be associated with the one or more slopes of the one or more lines that pass through the intersections of a line corresponding to a given point in the scene and/or the lines corresponding to left-eye and right-eye views. In some embodiments, the method may reposition the plurality of views of the multi-view image content and/or may adjust the one or more slopes of the multi-view image content at a transition. In some embodiments, repositioning the plurality of views of the multi-view image content may include adjusting a slope of the multi-view image content at a transition. In some embodiments, the one or more slopes may include one or more depths.

In some embodiments, the method may include shearing the multi-view image content locally. Shearing the multi-view image content locally may include dividing the multi-view image content into a plurality of portions of the multi-view image content, and/or repositioning a plurality of view of each of the portions of the multi-view image content. In some embodiments, the method may include stitching the multi-view image content, including propagating transitions in the multi-view image content into different views of the multi-view image content in different regions.

In some embodiments, the multi-view image content used by the method may include multi-view frames across a time domain. In some embodiments, the method may select a sample of multi-view frames from the time domain. The method may also perform at least one of reducing and/or removing the visibility of the one or more artifacts from the sample of multi-view frames by modifying the multi-view image content. The method may also perform at least one of reducing and/or removing the visibility of the one or more artifacts from non-selected multi-view frames by interpolating changes from the nearest multi-view frames in the time domain.

Some embodiments may include a computer-implemented system. The system may include a memory storing multi-view image content (including but not limited to one or more multi-view images). The system may also include an artifact removal module configured to perform at least one of reducing and/or removing the visibility of one or more artifacts from the multi-view image content by modifying the multi-view image content. Modifying the multi-view image content may be based upon at least one of: shearing the multi-view image content globally, shearing the multi-view image content locally, and/or stitching the multi-view image content. The artifact removal module may be further configured, based upon the modification of the multi-view image, to provide one or more updated multi-view images with improved visibility as compared with the multi-view image, at least with respect to the one or more artifacts.

In some embodiments of the system, shearing (globally and/or locally) of the multi-view image content may be performed in one or more primary domains and/or on one or more light fields (including but not limited to one or more light fields and/or one or more epipolar-plane images or EPIs) that may be associated with the multi-view image content. In some embodiments, stitching the multi-view image content may be performed in one or more gradient domains that may be associated with the multi-view image content.

In some embodiments of the system, the artifact removal module may be further configured to modify the multi-view image content by shearing the multi-view image content globally, shearing the multi-view image content locally, and stitching the multi-view image content. In some embodiments, the system may shear the multi-view image content globally including repositioning a plurality of views of the multi-view image content.

In some embodiments of the system, in one or more EPIs (epipolar-plane images) of the multi-view image content, the depth of one or more scenes of the multi-view image content may be encoded by one or more slopes of one or more lines that may correspond to one or more points in the one or more scenes. In some embodiments, a perceived depth may be associated with the one or more slopes of the one or more lines that pass through the intersections of a line corresponding to a given point in the scene and/or the lines corresponding to left-eye and right-eye views. In some embodiments, the system may reposition the plurality of views of the multi-view image content and/or may adjust the one or more slopes of the multi-view image content at a transition. In some embodiments, repositioning the plurality of views of the multi-view image content may include adjusting a slope of the multi-view image content at a transition. In some embodiments, the one or more slopes may include one or more depths.

In some embodiments of the system, shearing the multi-view image content locally may include dividing the multi-view image content into a plurality of portions of the multi-view image content, and repositioning a plurality of views of each of the portions of the multi-view image content. In some embodiments of the system, stitching the multi-view image content may include propagating transitions in the multi-view image content into different views of the multi-view image content in different regions. In some embodiments of the system, the multi-view image content may include multi-view frames across a time domain.

Some embodiments of the system may include a selection module configured to select a sample of multi-view frames from the time domain. In addition, the artifact removal module may be configured to perform at least one of reducing and/or removing the visibility of the one or more artifacts from the sample of multi-view frames by modifying the multi-view image content and perform at least one of reducing and/or removing the visibility of the one or more artifacts from non-selected multi-view frames by interpolating changes from the nearest multi-view frames in the time domain.

Some embodiments are directed to a non-transitory computer readable medium having stored thereon a sequence of instructions which, when loaded and executed by a processor coupled to an apparatus, causes the apparatus to: store multi-view image content (including but not limited to one or more multi-view images); perform at least one of reducing and/or removing the visibility of one or more artifacts from the multi-view image content by modifying the multi-view image content based upon at least one of shearing the multi-view image content globally, shearing the multi-view image content locally, and stitching the multi-view image content; and provide one or more updated multi-view images, based upon modification of the multi-view image content, with improved visibility as compared with the multi-view image content, at least with respect to the one or more artifacts.

In some embodiments of the apparatus, shearing (globally and/or locally) of the multi-view image content may be performed in one or more primary domains and/or on one or more light fields (including but not limited to one or more light fields and/or one or more epipolar-plane images or EPIs) that may be associated with the multi-view image content. In some embodiments, stitching the multi-view image content may be performed in one or more gradient domains that may be associated with the multi-view image content.

In some embodiments of the apparatus, the instruction may further cause the apparatus to further modify the multi-view image content by shearing the multi-view image content globally, shearing the multi-view image content locally, and stitching the multi-view image content. In some embodiments, the instruction may further cause the apparatus to shear the multi-view image content globally including repositioning a plurality of views of the multi-view image content.

In some embodiments of the apparatus, in one or more EPIs (epipolar-plane images) of the multi-view image content, the depth of one or more scenes of the multi-view image content may be encoded by one or more slopes of one or more lines that may correspond to one or more points in the one or more scenes. In some embodiments, a perceived depth may be associated with the one or more slopes of the one or more lines that pass through the intersections of a line corresponding to a given point in the scene and/or the lines corresponding to left-eye and right-eye views. In some embodiments, the apparatus may reposition the plurality of views of the multi-view image content and/or may adjust the one or more slopes of the multi-view image content at a transition. In some embodiments, the instruction may further cause the apparatus to reposition the plurality of views of the multi-view image content including adjusting a slope of the multi-view image content at a transition. In some embodiments, the one or more slopes may include one or more depths.

Some embodiments may transform input image data (e.g., input light fields) by modifying the input image data (for non-limiting example, to make it more repetitive). Some embodiments may transform the input image data by global and/or local shearing, and optionally followed by stitching of repeated fragments of the image. The method (and system) of some embodiments may transform the input image data by reducing discontinuities (and/or artifacts and/or transitions) in the input image data, thereby leading to visual quality improvements.

Some embodiments may also provide functional improvements to the quality of images. Some embodiments may reduce artifacts, including but not limited to discontinuities, depth reversals, and excessive disparities that may appear in an image. Some embodiments provide a functional improvement to display (and/or representation) of images by improving visual quality of input images by global and/or local shearing. Some embodiments may provide a further improvement of image visual quality by stitching the resulting globally and/or locally sheared image. Several experiments and results to follow illustrate that some embodiments may exhibit substantial functional improvements that enhance the visual quality of images.

BRIEF DESCRIPTION OF THE DRAWINGS

The patent or application file contains at least one drawing executed in color. Copies of this patent or patent application publication with color drawings will be provided by the Office upon request and payment of the necessary fee.

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

Figure 1A:
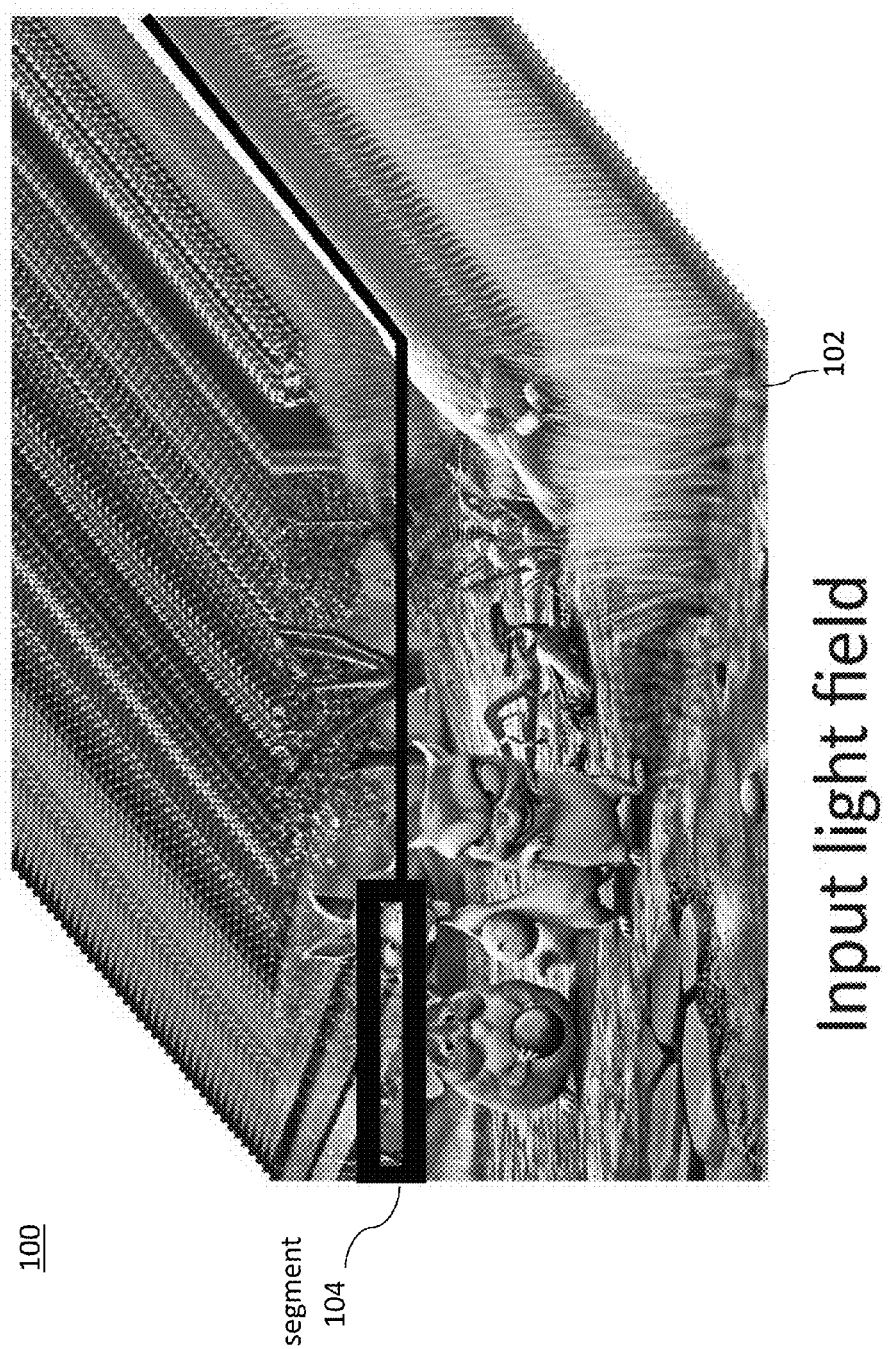
FIG. 1A is a diagram illustrating a non-limiting example input light field that may be used as an input to some embodiments ("Big Buck Bunny" © by Blender Foundation).

FIG. 1A is a diagram 100 illustrating an example three-dimensional (3D) input light field 102 that may be used as an input to some embodiments of the present invention. The example light field 102 includes one or more segments 104. To reduce artifacts caused by the limited angular view coverage of an automultiscopic display, some embodiments may perform light field manipulation to improve continuity of the display. According to some embodiments, an input light field 102 may include but is not limited to including, an epipolar-plane image (EPI), e.g. a two-dimensional (2D) slice of a three-dimensional (3D) input light field, and/or an input image frame. Some embodiments may include an input light field that is associated with holographic stereography, a holographic stereogram, autostereoscopy, and/or a spatially multiplexed holographic stereogram.

Figure 1B:
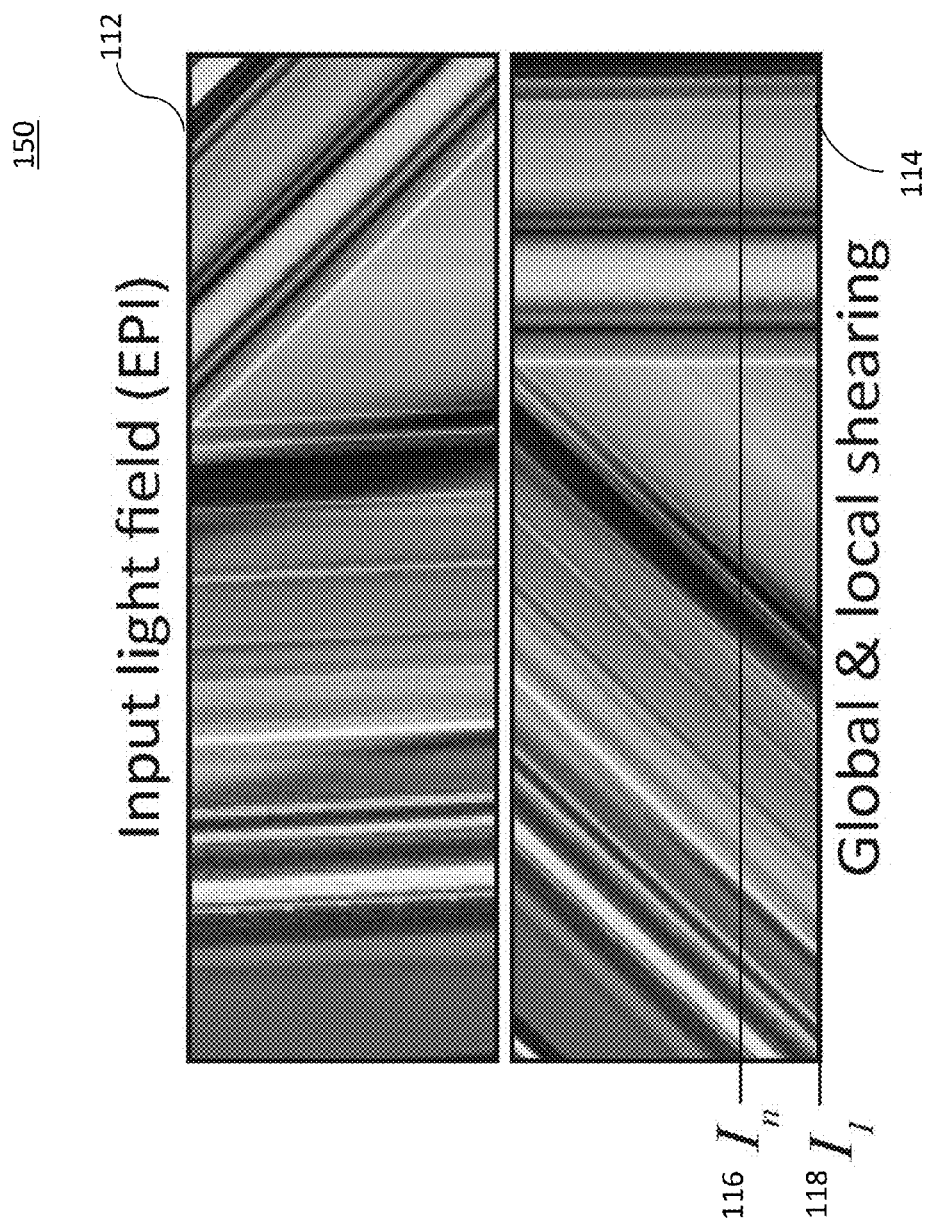
FIG. 1B is a diagram illustrating performing global and local shearing operations on an input light field of FIG. 1A, according to some embodiments.

FIG. 1B is a diagram illustrating performing the method (and system) 150 of the present invention including a global (and local) shearing operation on an input light field 112 (e.g., an EPI which is also the segment 104 of FIG. 1A), according to some embodiments. After performing global shearing, some embodiments may then perform local shearing on the global sheared light field output, thereby outputting a globally and locally sheared output 114. An advantage of some embodiments is that the output 114 may align the scene around the screen plane and provide an improved structural alignment between the first view 118 and the last view 116 shown on the display, (e.g., $I_1$, or element 118, and $I_n$, or element 116, respectively).

Figure 1C:
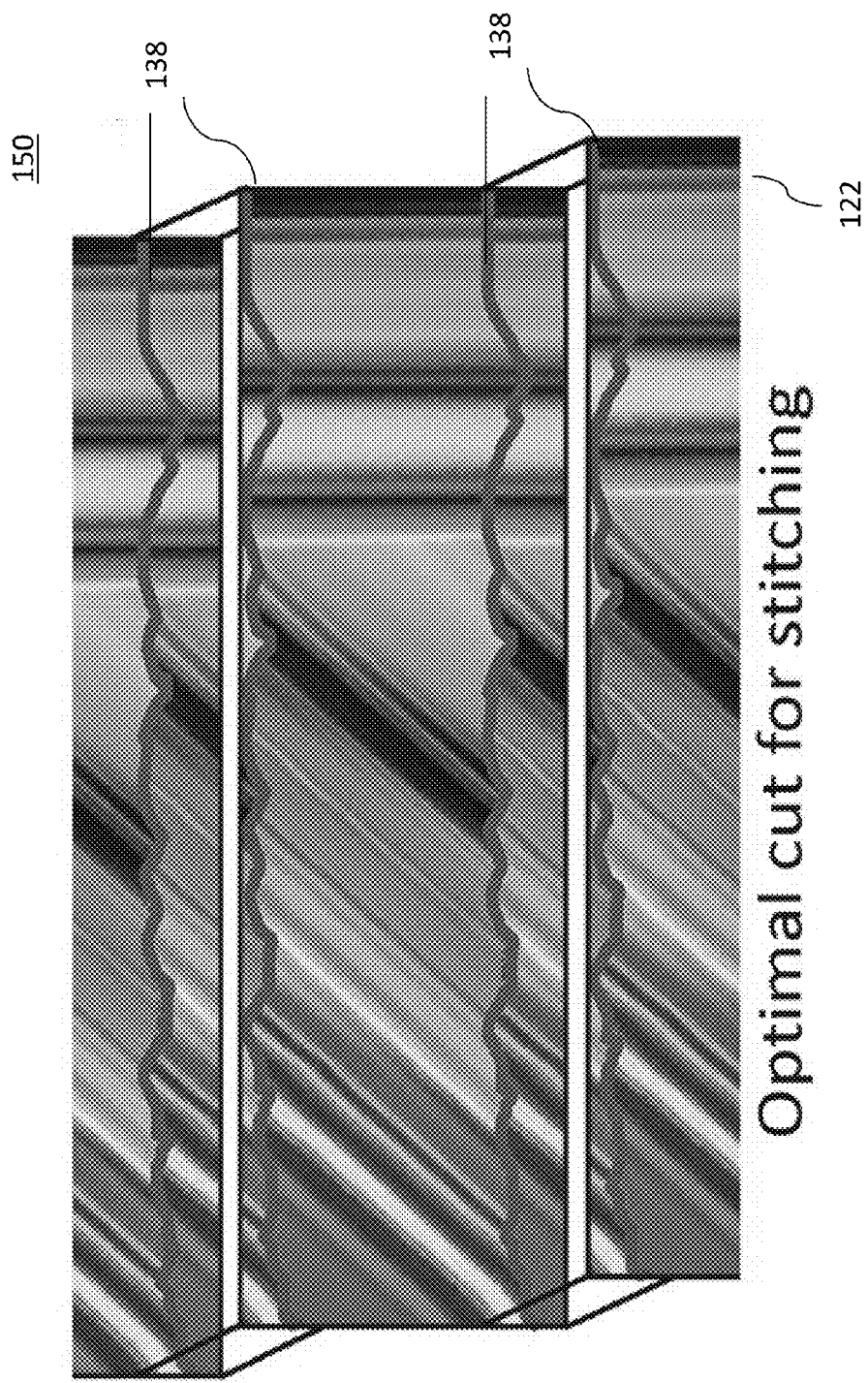
FIG. 1C is a diagram illustrating performing overlapping replicas of the light field of FIG. 1B to determine an optimal stitching cut, according to some embodiments.
Figure 1D:
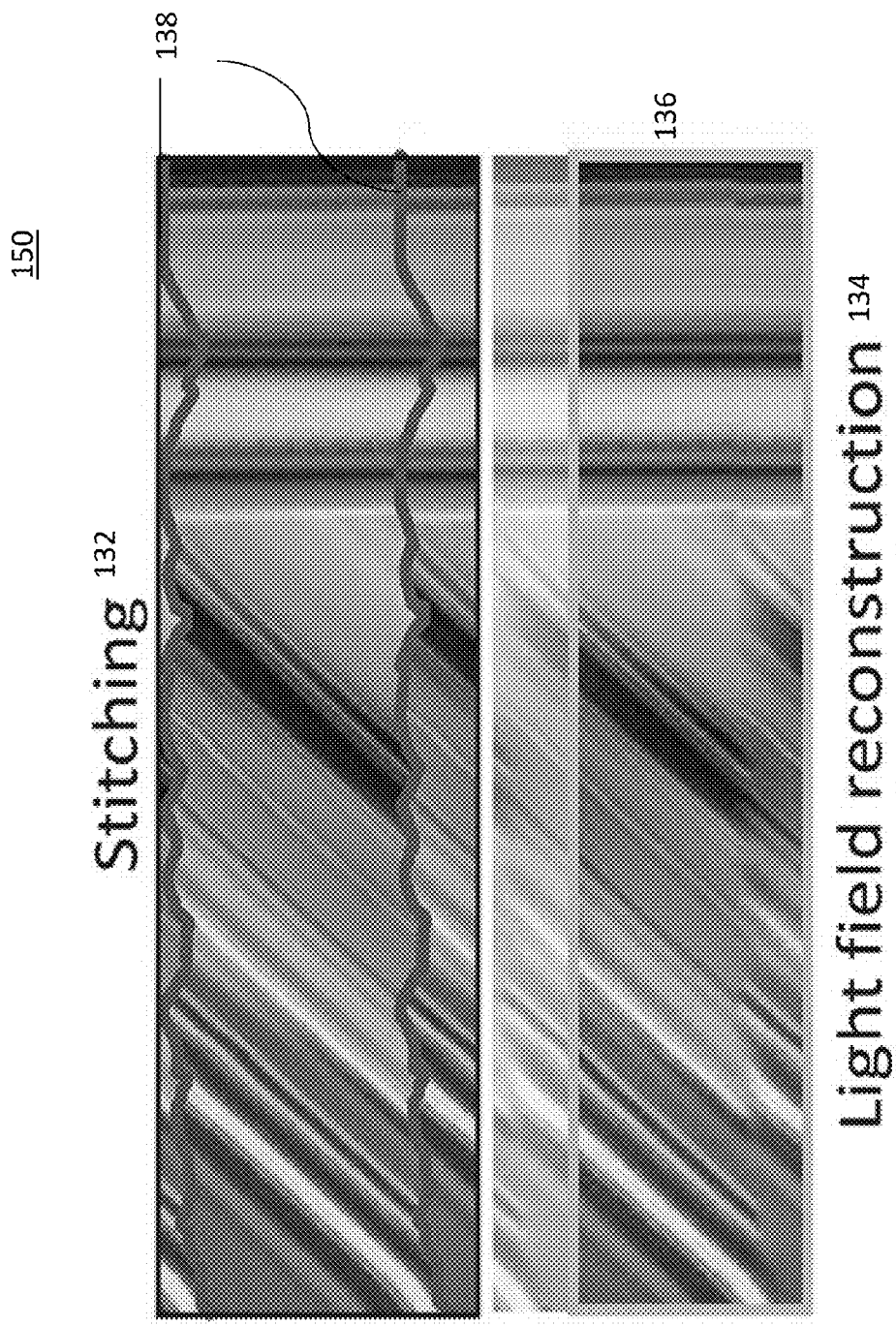
FIG. 1D is a diagram illustrating stitching along the determined cut of FIG. 1C in a gradient domain and reconstructing the light field, according to some embodiments.

Next, according to some embodiments, as illustrated in the diagram of FIG. 1C, the method (and system) 150 of the present invention may overlap replicas of the light field in order to determine an optimal stitching cut 122. Then, as illustrated in FIG. 1D, some embodiments may stitch 132 along the cut 138 in a gradient domain and reconstruct the light field 134. According to some embodiments, a portion of the reconstructed light field (element 136) may be then shown on the screen.

Figure 2:
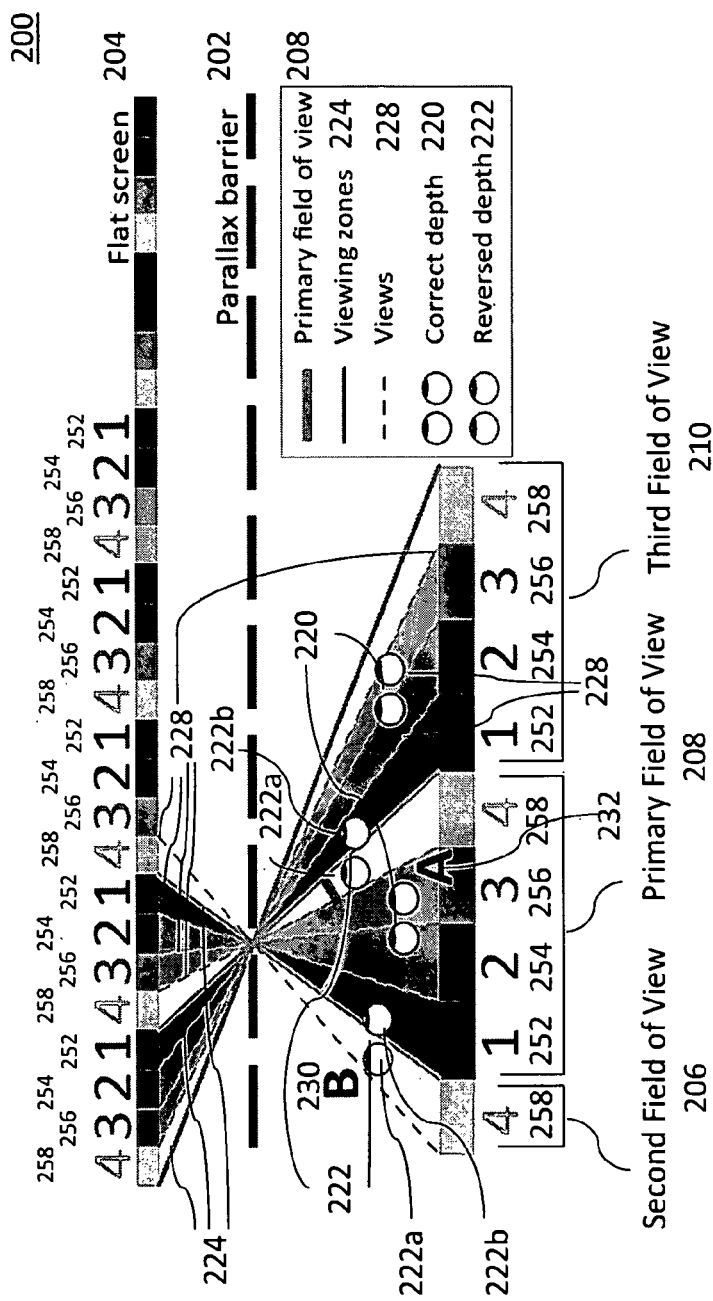
FIG. 2 is a diagram illustrating a four-view stereoscopic display presenting a scene to a user through a parallax barrier, according to some embodiments.

According to some embodiments, FIG. 2 is a diagram 200 illustrating a four-view stereoscopic display (e.g., flat screen 204) presenting a scene to a user through a parallax barrier 202 partitioned into views 228 and viewing zones 224. A sequence of images, e.g., image scenes 1 (element 252), 2 (element 254), 3 (element 256), 4 (element 258), shown in varying shades in FIG. 2 are shown within a primary field of view 208 to provide an adequate binocular parallax to the user. Beyond the primary field of view 208, the same sequence of images may repeat, forming additional viewing zones 224 (e.g., second field of view 206 and third field of view 210), which may extend the effective field of view, according to some embodiments.

As such, according to some embodiments, at least one advantage (and/or functional improvement) of such solutions is that they may provide immersive glasses-free 3D for multiple users in front of the screen. According to some embodiments, such "stereo free-viewing" may be preferable to enable 3D displays to succeed (e.g., considering for non-limiting example, a family watching a 3D television at home).

However, a problem with automultiscopic displays may arise when a viewer's left eye and right eyes fall into different view zones (referring to viewpoint B, or element 230 in FIG. 2). For non-limiting example, the black pair of eyes 220 entirely within the primary field of view 208 (also referring to viewpoint A, or element 232) and the black pair of eyes 220 entirely within the third field of view 210 may be positioned to view the image with a correct depth. However, the red pair of eyes 222 that crosses the border of the second field of view 206 and primary field of view 208 (referring to viewpoint B, or element 230) and the red pair of eyes 222 that crosses the border of the primary field of view 208 and third field of view 210 may be positioned to view a depth reversal and may view artifacts. This is because the "left" eye 222a may be view scene 4 (element 258) and the "right" eye 222b may be viewing scene 1 (element 252), but scene 4 (element 258) is supposed to be to the right of scene 1 (element 252), not to the left of scene 1 (element 252). In other words, in some embodiments, the view may not continue across the boundary of the field of view.

In this situation, depth reversal and extensive disparities may occur. Besides wrong depth reproduction, the reversed depth may also create a conflict between occlusion depth cue and binocular disparity. This may lead to significant quality reduction for non-optimal viewing positions. These phenomena may be referred to as transitions. In some embodiments, transitions may be considered as an intrinsic defect of multi-view autostereoscopic displays.

The artifacts due to the limited extent of viewing zones in current displays are widely recognized in the art as a significant shortcoming (which is solved and/or overcome by some embodiments). Such artifacts may reduce usage of screens in home applications and large scale visualizations. Existing solutions (see the following publications which are incorporated by reference herein in their entirety, Peterka, T., Kooima, R. L., Sandin, D. J., Johnson, A. E., Leigh, J., and Defanti, T. A., "Advances in the Dynallax Solid-State Dynamic Parallax Barrier Autostereoscopic Visualization Display System," *IEEE Transactions on Visualization and Computer Graphics* 14, 487-499, May-June 2008; Yi, S.-Y., Chaeand, H.-B., and Lee, S.-H., "Moving Parallax Barrier Design for Eye-Tracking Autostereoscopic Displays," 3*DTV Conference: The True Vision—Capture, Transmission and Display of* 3*D Video*, May 2008; and Ye, G., State, A., and Fuchs, H., "A Practical Multiviewer Tabletop Autostereoscopic Display," 2010 9*th IEEE International Symposium on Mixed and Augmented Reality* (*ISMAR*), 147-156, October 2010) may be based on hardware extensions, including head-tracking and dynamic parallax barriers. Although such existing solutions may reduce the problem, such existing solutions are suitable only for a small number of viewers (one to three viewers). Furthermore, the additional hardware and the need for real-time processing, which may depend on the current viewer's position, may make these existing approaches difficult to implement in commercial devices such as three dimensional televisions (3DTVs).

Although these transitions may significantly affect the visual quality, no existing research or solution addresses this problem of transitions. Some embodiments of the present invention include a method (and system) to reduce the visual effect of these transitions. In some embodiments, the method may optimize input images in order to improve the perceived quality, including but not limited to, in places where the transitions normally occur. The results of the method for static images and video sequences using both parallax barriers and lenticular sheets may improve the image quality in places where transitions normally occur. To further validate the quality improvement, a user study (e.g., experiment) that analyzes advantages of the optimized content created by some embodiments is shown to follow.

In contrast to previous hardware solutions, some embodiments may include an optimization that does not require knowledge about a viewer's position, which may provide an advantage in that it makes the technique suitable for an arbitrary number of observers. Some embodiments also do not require hardware modifications and may be used as a pre-processing step to displaying an image.

A method (and system) employed in some embodiments may be related to light field processing and manipulation techniques and may employ techniques for seamless image and video compositing. According to some embodiments, multi-view content may include enough degrees of freedom to improve its quality by modifying the displayed views.

In addition, some embodiments may analyze light fields produced by lenticular and/or parallax-barrier displays. In some embodiments, unlike in real world, the light fields produced by such screens may have a repetitive structure. This may induce visual artifacts in the form of view discontinuities, depth reversals, and/or excessive disparities when viewing position is not optimal. Although such problems may be inherent to the technology, some embodiments demonstrate that light fields reproduced on automultiscopic displays may include enough degrees of freedom to improve the visual quality of displayed images. Some embodiments may include a method that may modify light fields using global and/or local shears, followed by stitching, in order to improve the continuity of the light fields when displayed on a screen. Some embodiments enhance visual quality significantly, which is demonstrated herein in a series of user experiments with an automultiscopic display as well as lenticular prints.

According to some embodiments, a light field may include a continuous function that represents radiance emitted from a scene, which are described in Levoy, M., and Hanrahan, P., "Light Field Rendering," in *Proceedings of the 23rd Annual Conference on Computer Graphics and Interactive Techniques*, ACM, 31-42, August 1996, which is incorporated by reference herein in its entirety. Light fields may be aliased due to the discrete nature of acquisition and display stages. Several techniques are developed that may correctly reconstruct light fields from recorded data (see, e.g., Isaksen, A., McMillan, L., and Gortler, S. J., "Dynamically Reparameterized Light Fields," in *Proceedings of the 27th Annual Conference on Computer Graphics and Interactive Techniques*, ACM Press/Addison-Wesley Publishing Co., 297-306, July 2000; and Stewart, J., Yu, J., Gortler, S. J., and McMillan, L., "A New Reconstruction Filter for Undersampled Light Fields," in *Proceedings of the 14th Eurographics workshop on Rendering*, Eurographics Association, 150-156, June 2003, which are incorporated by reference in their entirety herein) and to avoid spatial and/or inter-view aliasing on the automultiscopic display (see, e.g., Zwicker, M., Matusik, W., Durand, F., and Pfister, H., "Antialiasing for Automultiscopic 3D Displays," in *Proceedings of the 17th Eurographics Conference on Rendering Techniques*, Eurographics Association, 73-82, June 2006; Konrad, J., and Agniel, P., "Subsampling Models and Anti-Alias Filters for 3-D Automultiscopic Displays," *IEEE Transactions on Image Processing*, 15, 1, 128-140, January 2006; Didyk et al., "Joint view expansion and filtering for automultiscopic 3D displays", ACM Transactions on Graphics (TOG) 32, 6, 221, November 2013, which are incorporated by reference in their entirety herein). Content depth manipulation may further adjust content to a particular device (see e.g., Zwicker, M., Matusik, W., Durand, F., and Pfister, H., "Antialiasing for Automultiscopic 3D Displays," in *Proceedings of the 17th Eurographics Conference on Rendering Techniques*, Eurographics Association, 73-82, June 2006; Didyk, P., Ritschel, T., Eisemann, E., Myszkowski, K., Seidel, H.-P., and Matusik, W., "A Luminance-Contrast-Aware Disparity Model and Applications," *ACM Trans. Graph.*, 31, 6, 184:1-184:10, November 2012; and Masia, B., Wetzstein, G., Aliaga, C., Raskar, R., and Gutierrez, D., "Display Adaptive 3D Content Remapping," *Computers & Graphics* 37, 8, 983-996, July 2013, which are incorporated by reference in their entirety).

Content depth manipulation may focus on depth manipulations to achieve an optimal trade-off between blur introduced by interview antialiasing and presented depth. In addition, retargeting techniques may change the size of a displayed light field, thereby better adjusting light fields to different screens (see, e.g., Birklbauer, C., and Bimber, O., "Light-Field Retargeting," Wiley Online Library, *Computer Graphics Forum*, 31, 295-303, May 2012, which is incorporated by reference in its entirety herein). Also, resolutions in light field reproduction are addressed by techniques (see, Tompkin, J., Heinzle, S. Kautz, J., and Matusik, W., "Content-Adaptive Lenticular Prints," *ACM Trans. Graph.* 32, 4, 133:1-133:10, July 2013, which is incorporated by reference in its entirety herein) that increase the resolution of lenticular prints by optimizing lenslet arrays based on the input content.

With an increasing interest in light field capture and display, existing approaches such as light field morphing (see, Zhang, Z., Wang, L., Guo, B., and Shum, H.-Y., "Feature-Based Light Field Morphing," *ACM Trans. Graph.* 21, 3, 457-464, July 2002, which is incorporated by reference in its entirety herein), deformation (Chen, B., Ofek, E., Shum, H.-Y., and Levoy, M., "Interactive Deformation of Light Fields," *ACM Proceedings of the 2005 Symposium on Interactive 3D Graphics and Games*, 367 139-146, April 2005, which is incorporated by reference in its entirety herein) and compositing (Horn, D. R., and Chen, B., "Lightshop: Interactive Light Field Manipulation and Rendering," *ACM Proceedings of the 200 Symposium on Interactive 3D Graphics and Games*, 121-383 128, April 2007, which is incorporated by reference in its entirety herein) may manipulate and edit such content.

In some embodiments, lightfields may also provide a great flexibility in the context of stereoscopic content production. Existing techniques (Kim, C., Hornung, A., Heinzle, S., Matusik, W., and Gross, M., "Multi-Perspective Stereoscopy from Light Fields," *ACM Trans. Graph.* 30, 6, 190, December 2011, which is incorporated by reference in its entirety herein) may be used for generating stereo image pairs with a per-pixel disparity control where each view may be defined as a 2D cut through the 3D lightfield volume.

In some embodiments, in order to avoid transitions, the light field produced by an automultiscopic display may preferably be continuous. In order to achieve this goal, some embodiments may employ image stitching techniques, (see, e.g., Levin, A., Zomet, A., Peleg, S., and Weiss, Y., "Seamless Image Stitching in the Gradient Domain," *Computer Vision-ECCV*, 3024, 377-389, May 2004; Jia, J., and Tang, C.-K., "Image Stitching Using Structure Deformation," *IEEE Transactions on Pattern Analysis and Machine Intelligence*, 30, 4, 617-631, April 2008; Jia, J., Sun, J., Tang, C.-K., and Shum, H.-Y., "Drag-and-Drop Pasting," *ACM Transactions on Graphics* (TOG), 25, 631-637, July 2006; and Eisemann, M., Gohlke, D., and Magnor, M., "Edge-Constrained Image Compositing," *Proceedings of Graphics Interface 2011*, Canadian Human-Computer Communications Society, 191-198, May 2011, which are incorporated by reference in their entirety herein), which may combine different images into one a composition that may be more natural-looking. However, some embodiments may employ image stitching techniques to light fields which is novel and unique. Creating continuous light fields is also related to work on video textures (see, e.g., Schödl, A., Szeliski, R., Salesin, D. H., and Essa, I., "Video Textures," *Annual Conference on Computer Graphics, SIGGRAPH '00*, 489-498, July 2000; and Agarwala, A., Zheng, K. C., Pal, C., Agrawala, M., Cohen, M., Curless, B., Salesin, D., and Szeliski, R., "Panoramic Video Textures," *ACM Trans. Graph.*, (TOG), 24, 821-827, July 2005, which are incorporated by reference in their entirety herein), where the goal is to create sequences, which may be played continuously and indefinitely, and video retargeting (see, e.g., Rubinstein, M., Shamir, A., and Avidan, S., "Improved Seam Carving for Video Retargeting," *ACM Trans. Graph.* 27, 3, 16:1-16:9, August 2008, which is incorporated by reference in its entirety herein). According to some embodiments, the aforementioned techniques may employ gradient based compositing (see, e.g., Pérez, P., Gangnet, M., and Blake, A., "Poisson Image Editing," *ACM Trans. Graph.* 22, 3, 313-318, July 2003; and Agarwala, A., "Efficient Gradient-Domain Compositing Using Quadtrees," *ACM Trans. Graph.* (TOG), 26, Article No. 94, July, 2007, which are incorporated by reference in their entirety herein) and/or graph cut methods (see, e.g., Kwatra, V., Schödl, A., Essa, I., Turk, G., and Bobick, A., "Graphcut Textures: Image and Video Synthesis Using Graph Cuts," *ACM Trans. Graph.* 22, 3, 277-286, July 2003, which is incorporated by reference in its entirety herein), which may be employed by the method (and system) 150 of some embodiments.

Autostereoscopic Transitions

A standard autostereoscopic display (e.g., screen) may include a regular two-dimensional (2D) panel and an additional component (e.g., a parallax barrier and/or a lenticular screen) that may introduce a view dependence to pixels of images (i.e., only a subset of the pixels may be visible from a particular location). Introducing a view dependence to pixels may be achieved by using a special mask (e.g., a parallax barrier), which may be placed atop the screen and may occlude certain regions of the screen depending on the viewing location, referring back viewing locations of elements 222 and 220 in FIG. 2 (see also, e.g., Ives, U.S. Pat. No. 725,567, "Parallax stereogram and process of making the same, which is incorporated by reference in its entirety herein). Alternatively, the special barrier may include a lenticular sheet, which may redirect the light instead of blocking the light as a parallax barrier does (see, e.g., Lippmann "Épreuves réversibles donnant la sensation du relief", Journal of Physics 7, 4, 821-825, November 1908, which is incorporated by reference in its entirety herein). According to some embodiments, the selectivity introduced by the additional component enables encoding different views that may be visible from the corresponding locations. Additionally, if the views are displayed densely enough (e.g., with a high angular resolution), each eye may receive a different view, which may lead to stereoscopic viewing. In some embodiments, due to limited resolution of display panels, such screens may display a small number of views. For non-limiting example, a high-end automultiscopic display such as the PHILIPS BDL5571VS/00 may provide 28 views. This may enable reproducing a small part of the light field observed in the real world, which may impact the perceived quality of the automultiscopic display. While such a screen may be a parallax display, the same observations may hold for lenticular based systems.

Scene vs. Display Light Field

A light field is a function that may describe light traversing a scene. A four-dimensional function $\mathcal{L}$ may describe a light field produced by automultiscopic displays. The four-dimensional function $\mathcal{L}$ may be parameterized using two parallel planes (s, t) and (u, v). Such a parametrization $\mathcal{L}$ (s, t, u, v) may correspond to the image value obtained by intersecting a scene with a ray originating from the first plane at the location (s, t) and passing through the second plane at the location (u, v). According to some embodiments, for visualization purposes, epipolar-plane images (EPIs), may be two-dimensional (2D) slices through a three-dimensional (3D) and/or four-dimensional (4D) light field (e.g., the parameters t and v may be constant and/or fixed) and/or may correspond to a stack of one-dimensional (1D) skylines captured from different viewing locations along a horizontal direction. In such an image, each given point in the scene may correspond to a line that has a slope and/or slant that may encode the depth.

Figure 3A:
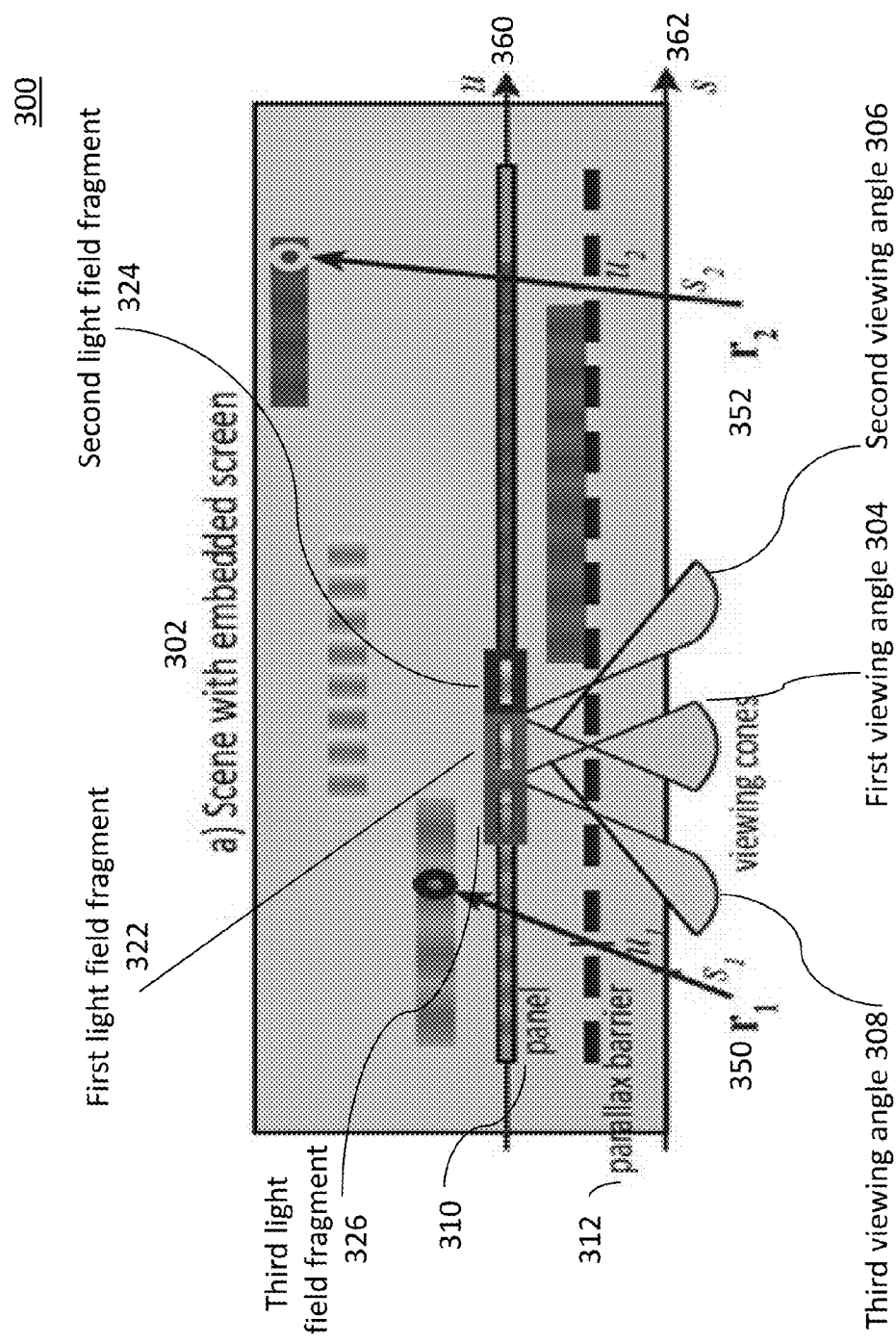
FIGS. 3A-3C show a scene (with an embedded screen) presented at a panel through a parallax barrier (FIG. 3A), a corresponding light field of the scene (FIG. 3B), and a light field produced by the screen (FIG. 3C), according to some embodiments.
Figure 3B:
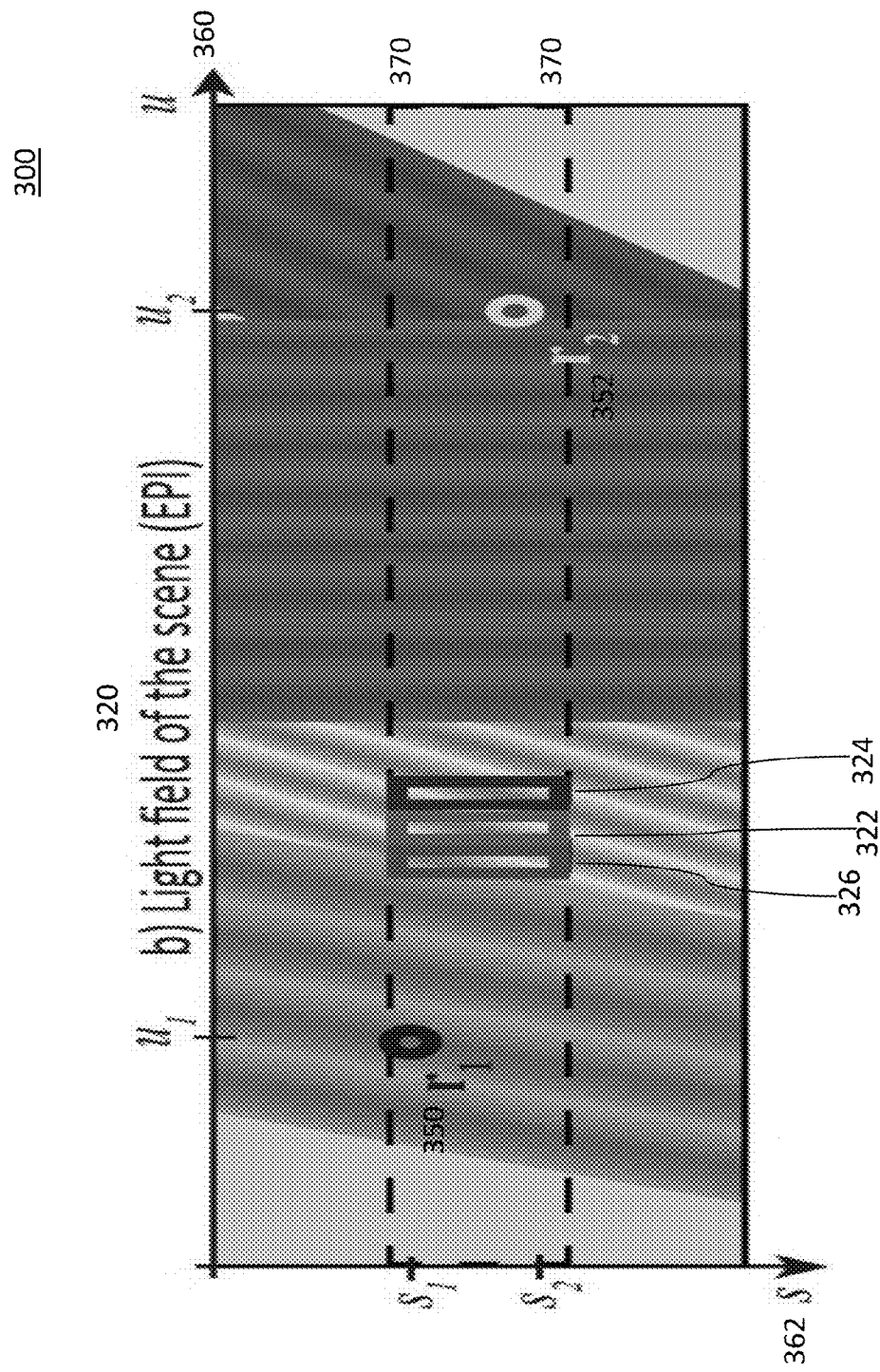
Figure 3C:
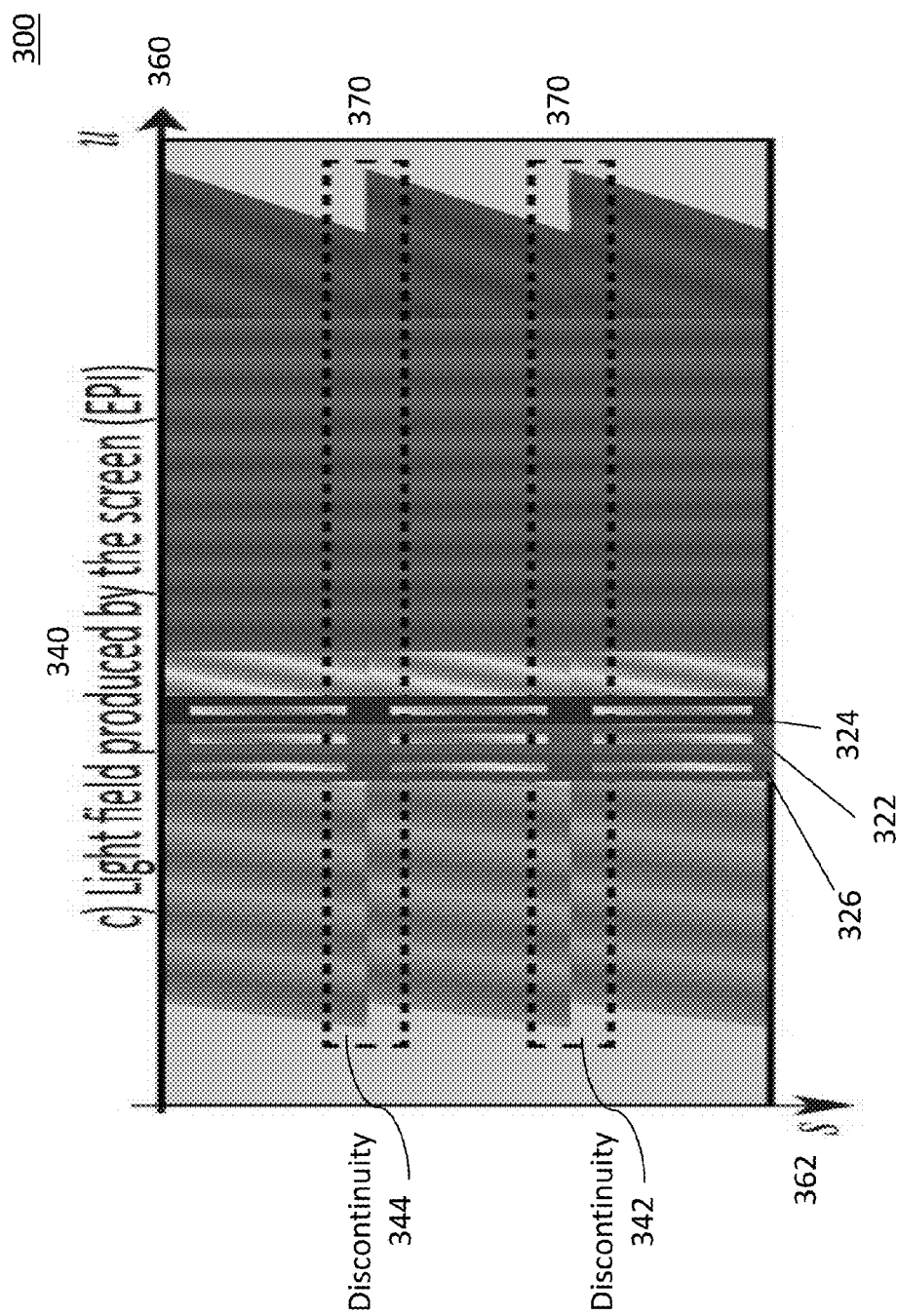

According to some embodiments, FIGS. 3A-3C (collectively, diagram 300) show a scene 302 presented at a panel 310 through a parallax barrier 312, a corresponding light field 320 of the scene, and a light field 340 produced by the screen. Rays $r_1$ (element 350) and $r_2$ (element 352) show the relationship between the scene 302 and the light field representation 320. In order to visualize the relation between the scene light field 320 and the light field 340 produced by the display, the screen may be embedded into the portion of the scene 302 and aligned with the u-axis 360. Note that the scene light field 320 in FIG. 3B depicts a portion of the scene and may extend further along the s (element 362) and u (element 360) axes. The display may produce a light field 340. In some embodiments, due to the angular coverage of the display with views (e.g., first viewing angle 304; green cone of FIG. 3A), the screen may reproduce a portion (e.g., part) of the original light field, which is shown by the dashed lines 370 in light field 320. As illustrated in FIG. 3C, beyond this range, the screen may create replicas of the light field, which may result in discontinuities 342 and 344 at the border of each replica in the light field 340.

The light field of FIGS. 3A-3C may more easily show the concept of a light field, by the light field extending further along the s-axis 362 and u-axis 360. In order to visualize the light field produced by an automultiscopic display, FIG. 3A illustrates the screen embedded in the scene 302. For every slit of the automultiscopic display, a small range of directions are shown by the first viewing angle 304 (e.g., green cones). The signal shown in these cones is also repeated at other locations along the s-axis 362, at the second viewing angle 306 and third viewing angle 308 (e.g., pink cones), although the signal may not correspond to these locations. This may create repetitions in the light field created by the screen. The colored boxes 322, 324, 326 (first light field fragment 322, second light field fragment 324, and third light field fragment 326) in FIGS. 3A-3C demonstrate how a fragment of the original light field 320 is encoded in the panel 310, and how the fragment forms replicas in the screen light field 340. As mentioned above, the repetitive structure of this light field 340 may create discontinuities 342 and 344, which may significantly affect the quality of perceived images.

Repetitive Light Field and Quality

Figure 4A:
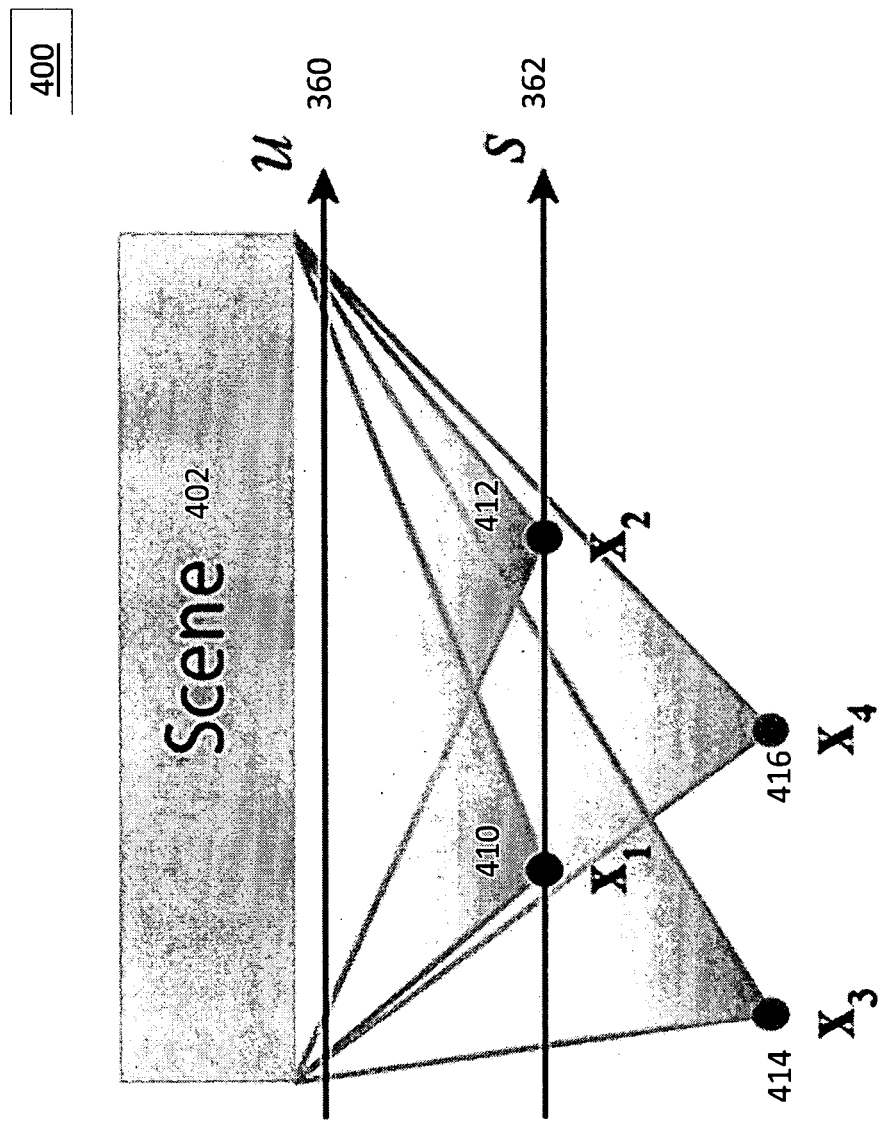
FIGS. 4A-B illustrate a scene (FIG. 4A) and its corresponding light field (FIG. 4B) in the two-plane parameterization, according to some embodiments.
Figure 4B:
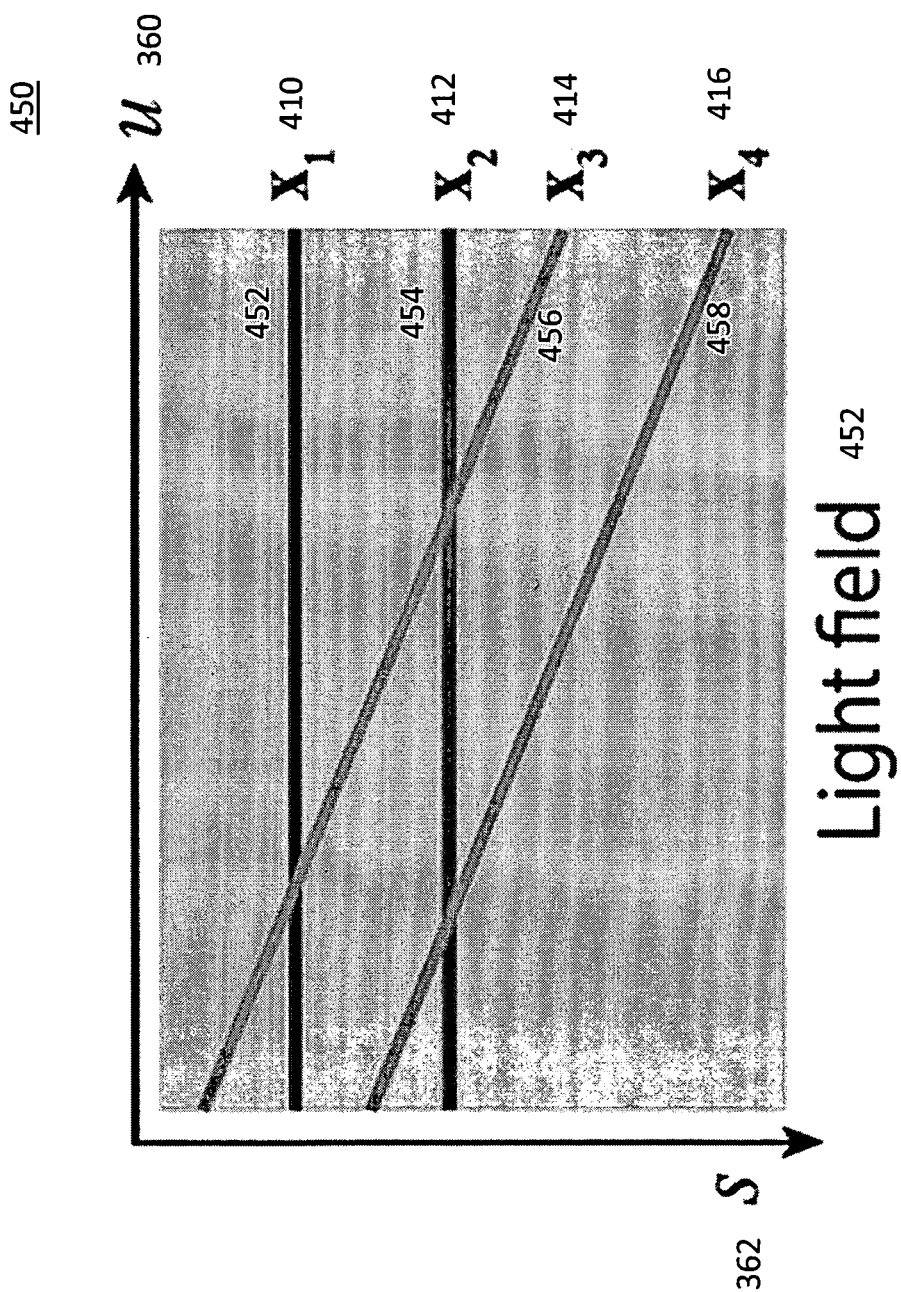

FIGS. 4A-B illustrate a scene 402 and its corresponding light field 460 in a two-plane parameterization, according to some embodiments. Images observed on the screen (of the scene) may correspond to linear cuts through the epipolar-plane images. While views located on the s-axis 362 may correspond to horizontal lines 452, 454, viewing positions that are removed from the s-axis 362 may correspond to slanted lines 456, 458. Slants encode the distance to the scene 402. Therefore, two viewing positions located the same distance away from the scene 402 may result in parallel lines. Please refer to Applicant's Supplementary Video (which is incorporated by reference in its entirety herein, and available on the Internet at the "MIT CSAIL" website, top level "people,", under the directory "pdidyk," followed by the sub-directory "projects," and the following sub-directory "MultiviewTransitions," as the file "MultiviewTransitions.avi," and also available under the title, "Improving Visual Quality of View Transitions in Automultiscopic Displays," September 2014) for a respective visualization.

FIG. 4A is a diagram 400 illustrating a scene 402 viewed at various points. FIG. 4B is a diagram 450 illustrating a light field 460 corresponding to the scene 402 viewed at the various points. The images observed on an automultiscopic screen may correspond to a cut through the created light field. For example, for a viewing location $(x_1, x_2)$, (where $x_1$ corresponds to element 410 and $x_2$ corresponds to element 412) located on the s-axis 362 (i.e., for a constant s), the view may be a horizontal cut, as shown by the corresponding horizontal cuts 452, 454, in FIG. 4B. As the observer moves along the s-axis (e.g., increases or reduces $x_1$, element 410, and/or $x_2$, element 412), the observer may see different skylines of the EPI. If the viewer (e.g., observer) moves away from the s-axis 362 to another viewpoint $(x_3, x_4)$, (where $x_3$ corresponds to element 414 and $x_4$ corresponds to element 416) the observed image may no longer correspond to a skyline, but to a slanted line, as shown by the slanted lines (elements 456 and 458) in FIG. 4B. FIGS. 4A-4B also depict a corresponding u-axis (360).

Figure 5:
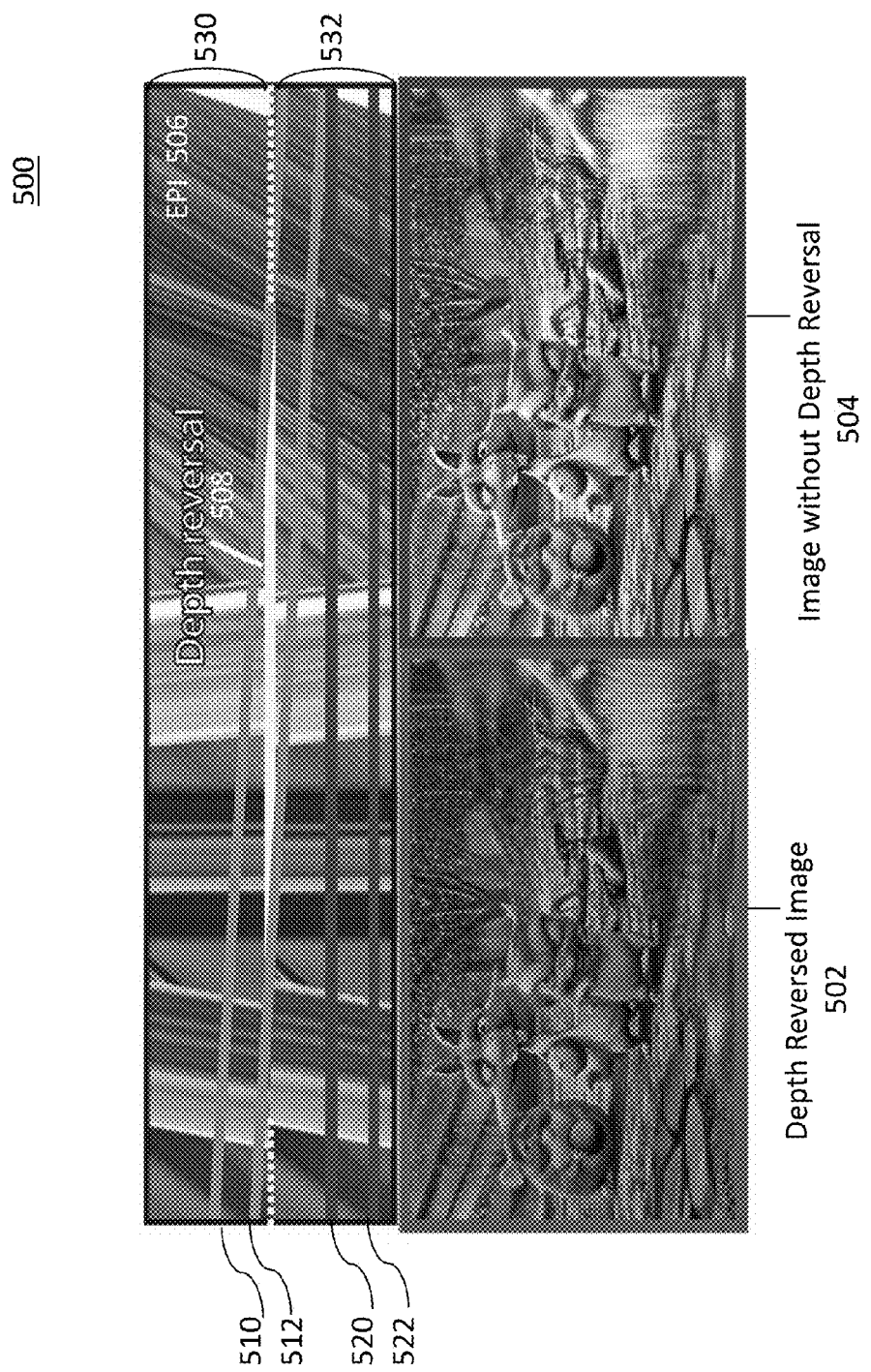
FIG. 5 is a diagram illustrating an example of a stereoscopic image with and without depth reversal, according to some embodiments ("Big Buck Bunny" © by Blender Foundation).

According to some embodiments, FIG. 5 is a diagram 500 illustrating a stereoscopic image with 502 and without 504 depth reversal 508. FIG. 5 illustrates an EPI (epipolar-plane image) 506 and cuts 510, 512, 520, 522 through the light field of the EPI 506. The depth reversed image 502 may include artifacts that are not present in the image without depth reversal 504. The depth reversed image 502 may correspond to the cut (the two parallel orange lines 510, 512 that cross the boundary between the view zones 530, 532) through the light field of the EPI 506. On the other hand, the image without depth reversal 504 may correspond to the two parallel black lines 520, 522 that do not cross the boundary between the view zones 530, 532.

The repetitive structure of the light field produced by an automultiscopic display may lead to visual artifacts. For non-limiting example, when a view corresponds to a slanted line in the EPI, the view may cross several replicas of the original light field. This may create a discontinuity in the perceived image at locations that correspond to the boundaries of the replicas. Furthermore, when an observer moves, such artifacts may be increasingly apparent as the observer changes its location.

Figure 6:
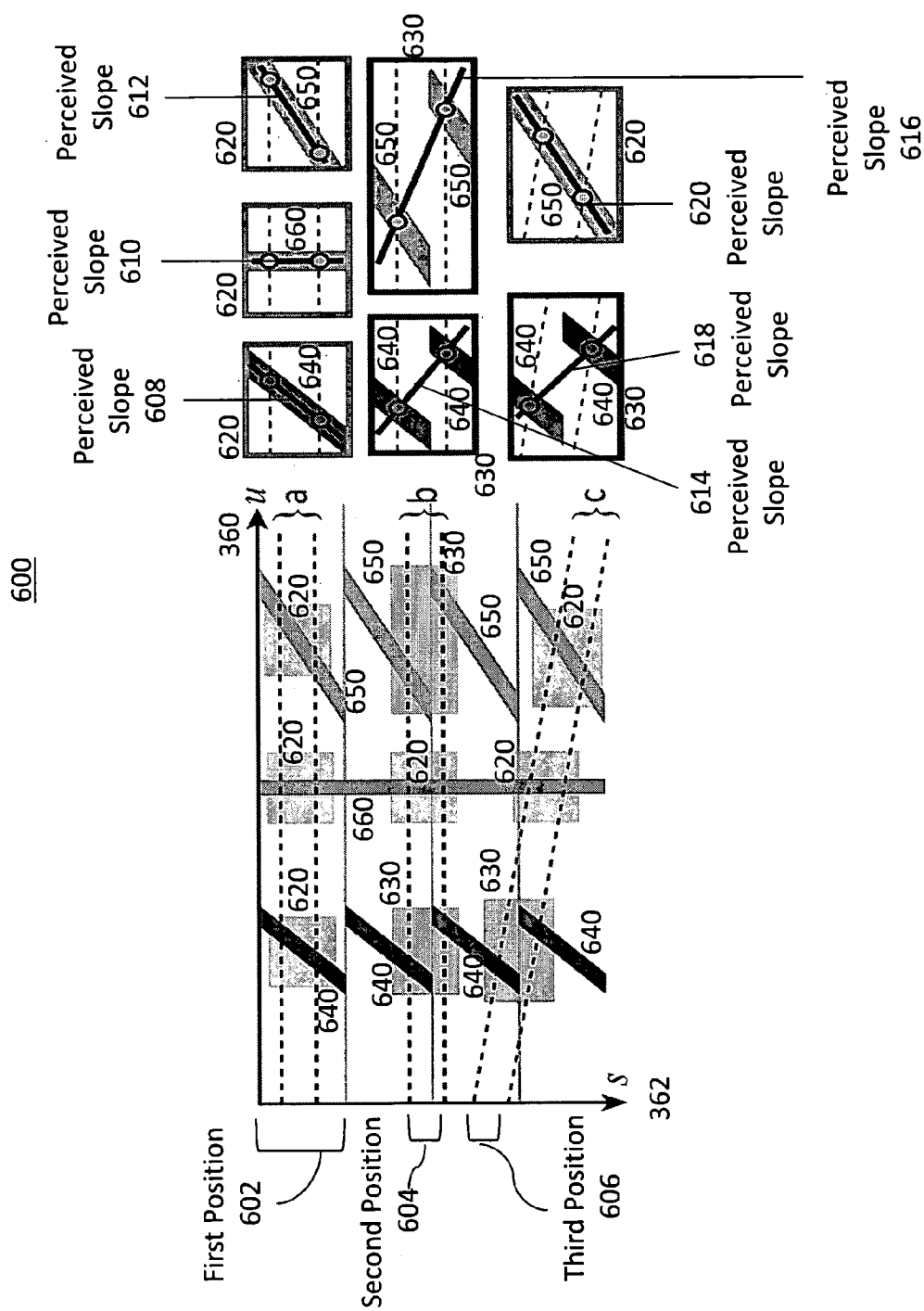
FIG. 6 is a diagram illustrating a light field produced by an automultiscopic display presenting three objects at different depths with three different stereoscopic viewing locations indicated by pairs of dashed lines, according to some embodiments.

In some embodiments, the above-mentioned scenario may also have a significant influence on depth perception. In EPIs, the depth of the scene may be encoded in the slopes of the lines that correspond to the same points in the scene. In contrast, the perceived depth may be related to the slope of the line that passes through the intersections of the line corresponding to a given point in the scene with lines corresponding to the left- and right-eye view (FIG. 6, case (b), element 604). When both eyes see the same replica of the light field, the perceived depth may be correct. However, when the views correspond to different replicas, the estimation of the slope may be incorrect. In particular, the sign of the slope may change, creating depth reversal or extensive disparities, which may lead to a viewing discomfort (see, e.g., Shibata, T., Kim J., Hoffman, D., and Banks, M., "The Zone of Comfort: Predicting Visual Discomfort with Stereo Displays," *Journal of Vision* 11, 8, 11:1-11:29, July 2011, which is incorporated by reference in its entirety herein). Depending on the viewing position, the depth reversal may be observed in the entire image and/or in some parts of the image. As illustrated in FIG. 6, case (c), element 606, some embodiments may include a stereoscopic image with and without depth reversal.

According to some embodiments, FIG. 6 is a diagram 600 illustrating a light field produced by an automultiscopic display presenting objects at different depths with different stereoscopic viewing locations indicated by pairs of dashed lines 602, 604, 606 (where each line in a given pair of the pairs 602, 604, 606 corresponds to a view for one eye of the user). Insets on the right present close ups at the light field. The solid lines 608, 610, 612, 614, 616, 618, 620 represent slant that may correspond to perceived depth. The boxes 620 and 630 indicate correct 620 and incorrect 630 depth reproduction, respectively. As illustrated in FIG. 6, element 602, case (a), both eyes may look at the same replica and the depths estimated by the observer may be correct. As illustrated in FIG. 6, element 604, case (b), both eyes may see different replicas for the thick lines 640 and the other thick lines 650. Therefore, the depth estimated by the user, as shown by the black lines 614, 616, 618, may be incorrect, as the depth is reversed. When the user is away from the plane s (element 362), the lines corresponding to the views are slanted and depth may be estimated wrongly for some part of the image, such as the thick red lines 640, but not the thick orange lines 650. Plane u (element 360) is also depicted in FIG. 6. In addition, in some embodiments, the thick blue lines 660 may indicate a perceived slope 610 in which depth estimation is the same for both eyes.

Light Field Shearing

Modifying multi-view content may reduce artifacts caused by the discontinuities in a light field produced by an automultiscopic display. Continuity of the light field at transitions may be improved by applying subtle modifications to the input content, which may hide display imperfections. In some embodiments, discontinuities in a light field may be removed if the multi-view content is carefully designed or modified. For non-limiting example, according to some embodiments, a scene may employ a repetitive structure.

Figure 7:
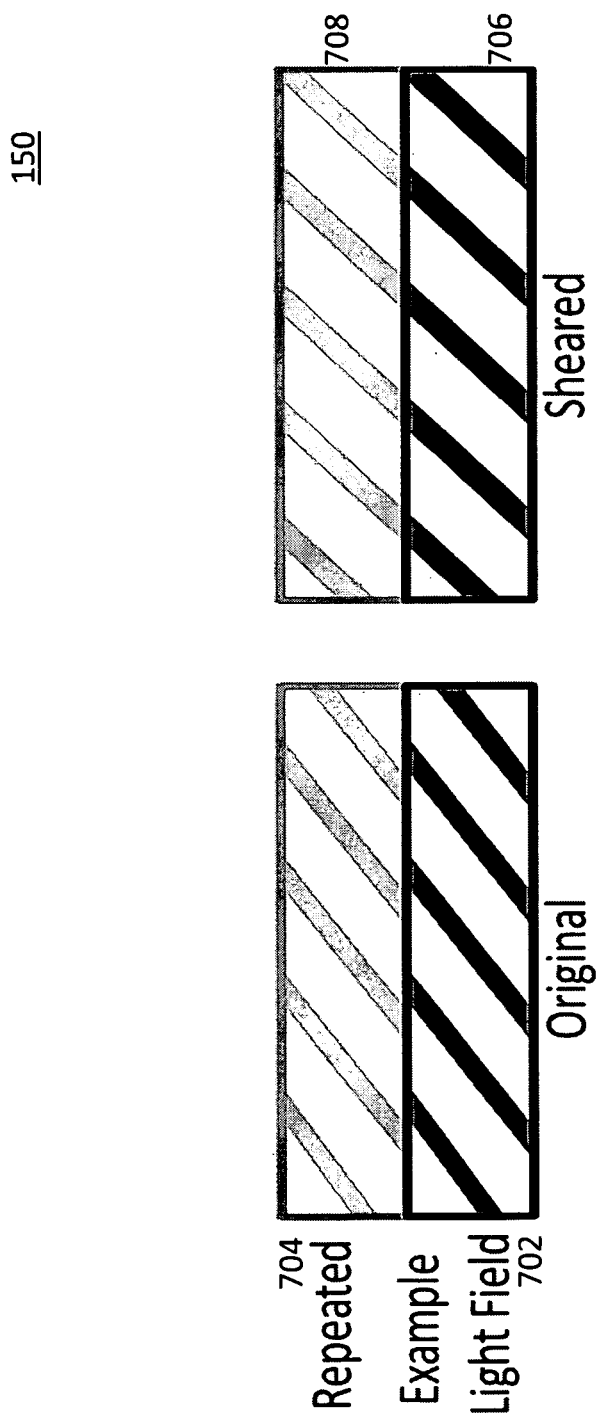
FIG. 7 is a diagram illustrating an original light field and a sheared light field, according to some embodiments.

FIG. 7 is a diagram illustrating an original light field 702 and a sheared light field 706, according to some embodiments that include the method (and system) 150 of the present invention. An original light field 702 may be produced by an automultiscopic display for a scene with a periodic pattern located at a certain depth. However, the original light field 702 may not line up optimally when repeated 704. In some embodiments, by applying a horizontal shear to the original light field 702, a new light field without transitions 706 may be obtained. In addition, in some embodiments, the sheared light field 706 may line up when repeated 708. As illustrated in FIG. 7, for a planar pattern, the discontinuities in the original light field 702 can be removed by applying a horizontal shear 706.

As the slope of each line corresponds to scene depth, a shear may corresponds to re-positioning the entire scene along the depth plane. Although this may modify the absolute depth, it may not significantly affect local depth changes, which may dominate depth perception (see Brookes, A., and Stevens, K. A., "The Analogy Between Stereo Depth and Brightness," *Perception* 18, 5, 601-614, February 1989, which is incorporated by reference in its entirety herein). Therefore, some embodiments may reduce discontinuities in a light field by performing a global horizontal shear followed by local shears that further improve the results (e.g., further reduce discontinuities).

Figure 8:
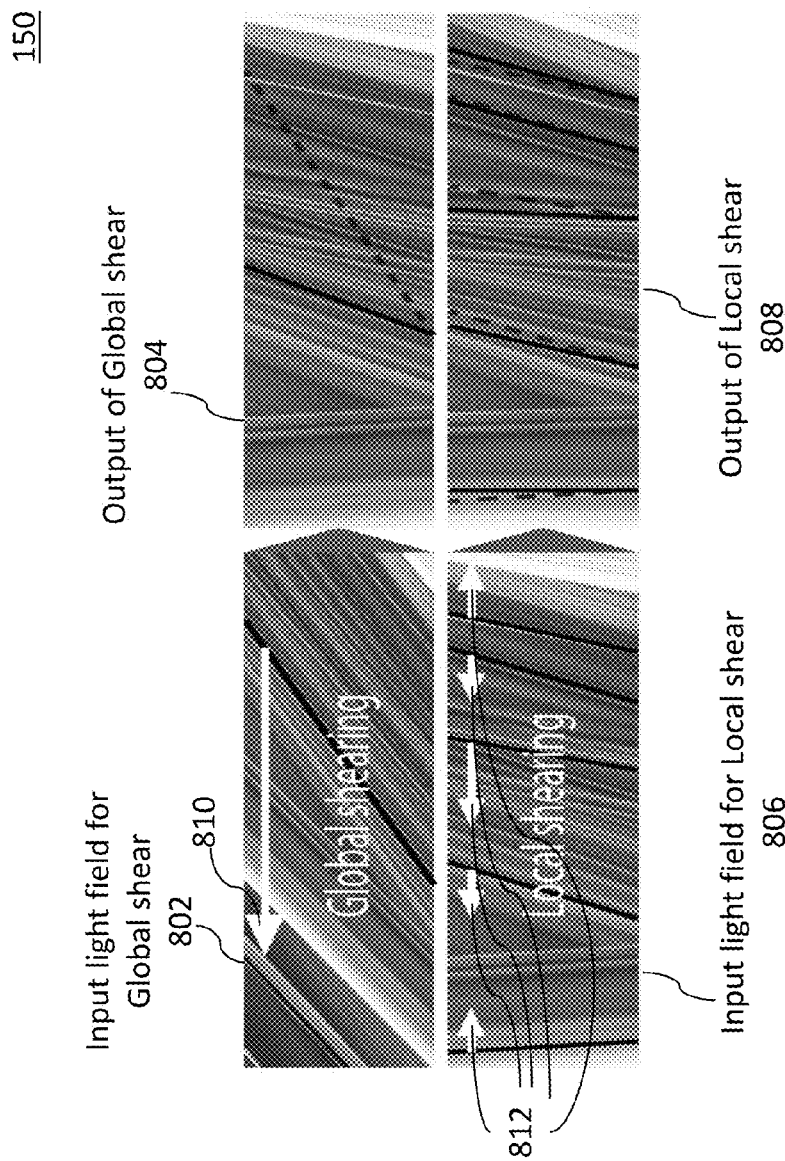
FIG. 8 is a diagram illustrating global and local shearing, according to some embodiments.

FIG. 8 is a diagram illustrating a method (and system) 150 that includes global and local shearing, according to some embodiments. An input light field 802 for global shearing may be globally sheared using the method (and system) described in the present application to produce the output 804 of the global shear. In the non-limiting example of FIG. 8, some embodiments may apply the global shearing method (and system) 150 to apply the shear (e.g., adjust the depth and/or change the slope in the primary domain, i.e., the domain of light fields and/or EPIs) by the amount shown in the arrow 810 (but not so limited to that amount) to the input light field 802. Then, some embodiments may apply local shearing to the output 804. Local shearing first divides the output of the global shear 804 (also input to local shear 806) into a grid and then shears each portion of the grid locally by the amount shown in the arrows 812 (but not so limited by that amount) within element 806. As such, local shearing may produce an output 808 of the local shear, which may further remove artifacts and/or transitions.

In some embodiments, global shear may be defined by one value s, which may encode the amount of shear that is applied to the last view of the light field shown on a screen to match the first view. In some embodiments, instead of modifying individual EPIs separately, the method (and system) 150 may apply the shear to the entire 3D light field, and may compute the optimal shear on 2D views using the following formula (Equation 1):

$$\operatorname*{argmin}_{s} \frac{1}{N_p} \sum_{(x,y)} Q(I_1, I_n, x, y, s) \qquad (1)$$

where $I_1$ and $I_n$ are the first and last views presented on the screen, $N_p$ is the total number of pixels, and Q is a matching error between the local neighborhood of a pixel (x, y) in $I_1$ and the neighborhood of (x+s, y) in $I_n$. In some embodiments, the method (and system) may employ a matching function (see, e.g., Mahajan, D., Huang, F.-C., Matusik, W., Ramamoorthi, R., and Belhumeur, P., "Moving Gradients: A Path-Based Method for Plausible Image Interpolation," *ACM Trans. Graph.* 28, 3, 42, August 2009, which is incorporated by reference in its entirety herein), which may also be applied to optical flow correspondence (Equation 2):

$$Q(I_1, I_n, x, y, s) = \qquad (2)$$
$$\sqrt{\frac{|\nabla I_1(x, y) - \nabla I_n(x+s, y)|^2 + 0.5|I_1(x, y) - I_n(x+s, y)|^2}{\sigma(I_1, x, y) \cdot \sigma(I_n, x+s, y)}}$$

where $\nabla I$ is a gradient of image I and $\sigma(I, x, y)$ represents the standard deviation in a 9×9 neighborhood of pixel (x, y) in view I. To find an improved (and/or a best) s, some embodiments may iterate over integer values in the range between $s_{min}$ and $s_{max}$ and choose the value that results in the smallest value of the matching function Q. In some embodiments, values $s_{min}$=−200 and $s_{max}$=200 are preferable, however, other values for $s_{min}$ and $s_{max}$ may be employed in other embodiments.

Local Shears

According to some embodiments, the optimization in Equation 1 may determine a large global shear that may minimize the matching error between the first and the last view. To further improve the continuity of the light field, some embodiments may further refine the light field using local shears (including, but not limited to, small local shears). Instead of computing the amount of shear for each pixel of $I_n$, some embodiments may define a regular grid (e.g., having dimensions m×m), and find optimal shears for these grid points. Finding an improved (and/or best) shear for every point separately may result in discontinuities, which may introduce significant compression and stretching to the light field. Therefore, the some embodiments may determine improved shear magnitudes that may vary smoothly across different locations.

Some embodiments may find an optical flow between two views and minimize differences between them using a warp guided by the flow field. In order to avoid flattening the scene, some embodiments may restrict local warps to be small, which may results in matching similar structures instead of the same objects. Finding a dense correspondence between views may also introduce an additional problem of disocclusions, which may lead to significant compression and stretching artifacts during the warping. In order to avoid these problems, some embodiments define a regular grid (e.g., 20×20), and find the optimal shears for the grid points. As such, some embodiments may find improved shear magnitudes that vary smoothly across different locations. In some embodiments, an additional step may be performed in that the coarse grid may be warped to improve the continuity of the light field. According to some embodiments, the problematic regions may be filled in using the neighboring signal.

Figure 9:
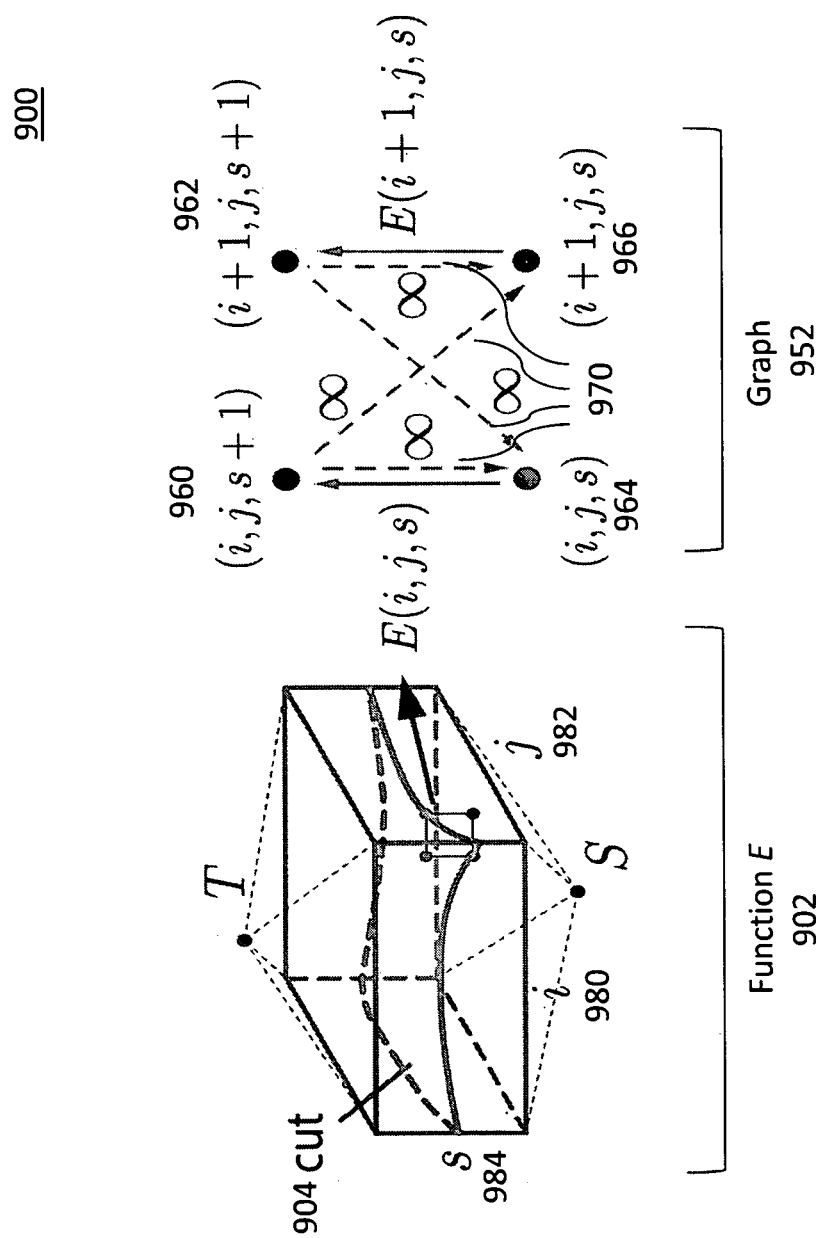
FIG. 9 is a diagram illustrating a corresponding cost function according to some embodiments.

The above-mentioned problem of finding the optimal local shear may be formulated as a minimum graph cut. To this end, for each grid point (i, j) some embodiments may create multiple nodes (i, j, s), where s may span a range of integer values from [$s'_{min}$, $s'_{max}$] and may correspond to different magnitudes of shear considered at each location. In some embodiments, $s'_{min}$=−10 and $s'_{max}$=10. The edges in the graph may be between (i, j, s) and (i, j, s+1), and may encode the cost of the shear s at the position (i, j). According to some embodiments, the cost may be defined as E(i, j, s)=Q($I_1$, $I_n$, i, j, s). In order to find a cut which defines optimal shears, some embodiments may add to the graph a source and a target node (S, T), which may be connected to (i, j, $s'_{min}$) and (i, j, $s'_{max}$) respectively. Additionally, to ensure that the cut is continuous and passes every position (i, j) at least once, some embodiments may adapt forward edges (see, e.g., Rubinstein, M., Shamir, A., and Avidan, S., "Improved Seam Carving for Video Retargeting," *ACM Trans. Graph.* 27, 3, 16:1-16:9, August 2008, which is incorporated by reference in its entirety herein) and may add additional edges with an infinite cost (FIG. 9, element 952). After finding the optimal cut of the graph, the amount of shear at the position (i, j) may be defined by the location of the cut, e.g., if the cut goes through edge (i, j, s)→(i, j, s+1), the optimal shear for position (i, j) may be s. In order to apply optimal shears to the light field, some embodiments may first propagate the optimal shears from $I_n$ to the views using linear interpolation, assuming that View $I_1$ may receive zero shear. Then, in some embodiments, each given view may be separately sheared by warping the grid together with the underlying view.

FIG. 9 is a diagram 900 illustrating the cost function E(i, j, s), also element 902, according to some embodiments. In FIG. 9, the cost function E(i, j, s), also element 902, is illustrated in three dimensions (element 980 representing the i axis, element 982 representing the j axis, and element 984 representing the s axis, respectively). A continuous cut 904 illustrates local warping. The corresponding weights 960, 962, 964, 966 on edges in the graph 952 are shown on the right. In FIG. 9, although forward edges (dashed lines 970) are shown in two dimensions, forward edges 970 may be represented in three or more dimensions in some embodiments. Forward edges 970 may be added in the s-i (elements 984, 980) and s-j (elements 984, 982) planes.

Light Field Stitching

The shearing techniques mentioned above may align the structure of the repeating light field fragments. However, sharp color differences may remain visible. Some embodiments may apply an additional compositing of repeating light field structures in a gradient domain. Some embodiments use image/video stitching and/or retargeting techniques (see, Jia, J., Sun, J., Tang, C.-K., and Shum, H.-Y., "Drag-and-Drop Pasting," *ACM Transactions on Graphics (TOG)*, 25, 631-637, July 2006; Jia, J., and Tang, C.-K., "Image Stitching Using Structure Deformation," *IEEE Transactions on Pattern Analysis and Machine Intelligence*, 30, 4, 617-631, April 2008; Rubinstein, M., Shamir, A., and Avidan, S., "Improved Seam Carving for Video Retargeting," *ACM Trans. Graph.* 27, 3, 16:1-16:9, August 2008; and Eisemann, M., Gohlke, D., and Magnor, M., "Edge-Constrained Image Compositing," *Proceedings of Graphics*

*Interface* 2011, *Canadian Human-Computer Communications Society,* 191-198, May 2011, which are incorporated by reference in their entirety herein) to further hide the transitions. To this end, some embodiments first create two copies of the original light field and overlap the two fields by m views along the s direction. Then, some embodiments may find a cut through the overlapping part, which may provide a surface where both replicas may fit better (and/or best). This cut, similarly to finding improved shears, may be found by using a graph cut technique, according to some embodiments. Therefore, some embodiments may first transform the overlapping light field volume into a graph, where each voxel (s, u, v) may correspond to a node. The edges between (s, u, v) and (s+1, u, v) may encode the cost of the cut between these two voxels. In some embodiments, a goal of this cost may be to penalize significant differences (significant with respect to a programmable and/or pre-defined threshold) in gradients between the overlapping replicas, expressed as (Equation 3):

$$C(u,v,s) = \|\nabla_{su}\mathcal{L}(s,u,v) - \nabla_{su}\mathcal{L}(n-m+1+s,u,v)\| + \|\nabla_{su}\mathcal{L}(s+1,u,v) - \nabla_{su}\mathcal{L}(n-m+2+s,u,v)\| \quad (3)$$

where $\nabla_{su}\mathcal{L}$ is the (s, u) component of the light field gradient, n is the total number of views, and m is the number of views that are overlapped. In some embodiments, various elements of Equation 3, including but not limited to (s, u, v) and (n−m+1+s, u, v), as well as (s+1, u, v) and (n−m+2+s, u, v), may be positions that are directly overlapping. Similarly to the construction of the graph for the local shearing, some embodiments may add forward edges with an infinite cost and a source and/or a target node to perform a minimal graph cut. Some embodiments, after finding the optimal cut of the graph, may stitch gradients of the overlapping light field replicas along the cut, and may compute the full light field by reconstructing each EPI separately using Poisson reconstruction (see, e.g., Pérez, P., Gangnet, M., and Blake, A., "Poisson Image Editing," *ACM Trans. Graph.* 22, 3, 313-318, July 2003, incorporated by reference herein in its entirety).

Figure 11:
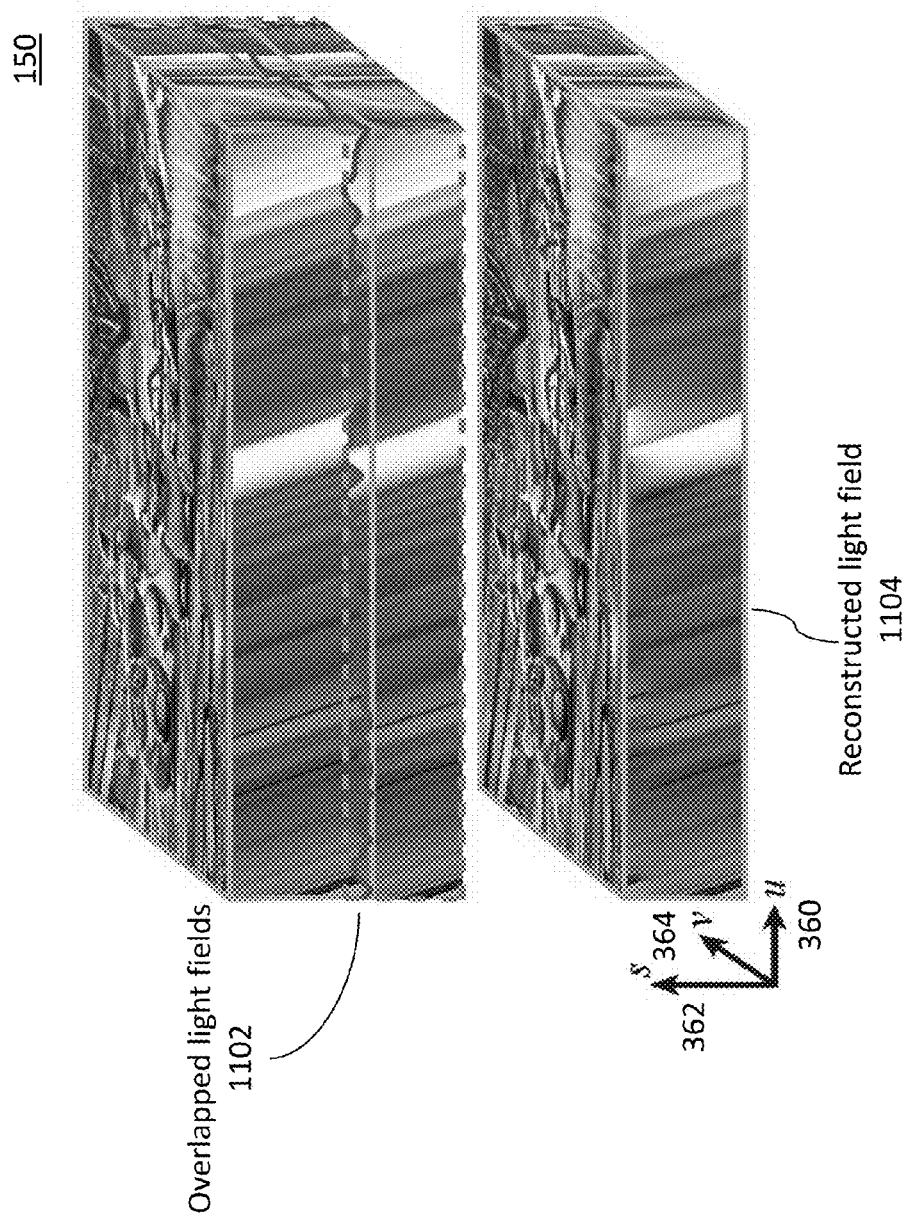
FIG. 11 illustrates the process of stitching by overlapping light field copies to find the optimal cut, according to some embodiments ("Big Buck Bunny" © by Blender Foundation).

FIG. 11 illustrates a method (and system) 150 of the present invention of stitching by overlapping light field copies to find the optimal cut, according to some embodiments. As illustrated in FIG. 11, the reconstructed light field results 1104 may have an overlap which has a width of half of the light field 1102 (where, for non-limiting example, m=n/2). According to some embodiments, the width of the overlap m may control the number of views that are affected by the method of the present invention. In some embodiments, 4 views are preferable in order to create an improved transition between different viewing zones. Therefore, for a display with 8 views, some embodiments may use m=n/2. For displays that offer higher numbers of views, a smaller m may be used. Other embodiments may use n/2 and n/4.

The method (and system) 150 of the present invention described above may apply to static light fields, according to some embodiments. However, some embodiments as described above may extend to shearing and stitching videos by including a computation of a minimal graph cut for a 4D volume and Poisson reconstruction in 3D (see three dimensions 360, 362, 364 of FIG. 11). In some embodiments, to avoid high computation costs, a computation may be performed for every k-th frame, rather than for each given frame of the video. Then, according to some embodiments, the shearing as well as cut may be linearly interpolated for the remaining frames between every k-th frame. Besides improved performance, such a solution may provide temporally coherent results in some embodiments. In some embodiments, k=50.

Results

Figure 10:
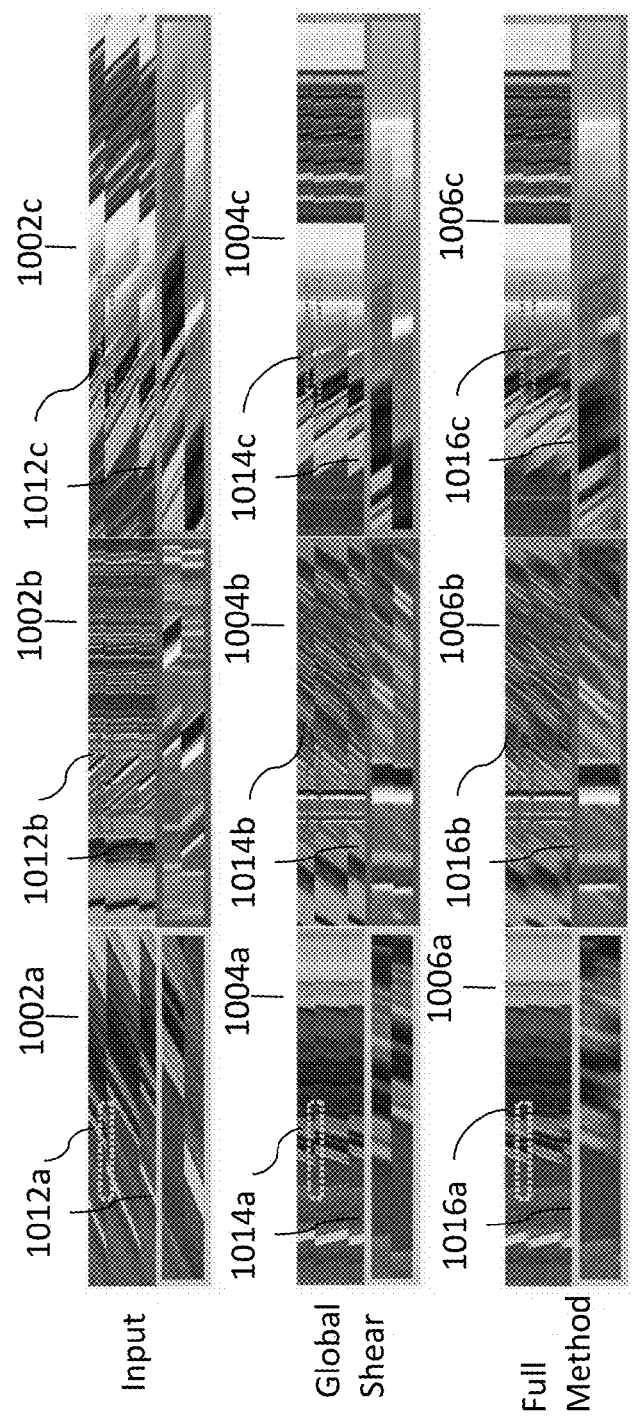
FIG. 10 is a diagram illustrating examples of light fields produced by some embodiments.

FIG. 10 is a diagram illustrating non-limiting examples of light fields produced by the method (and system) 150 of some embodiments. According to some embodiments, input light fields 1002a-c are globally sheared to produce corresponding global sheared light fields 1004a-c. In some embodiments, an additional step of the method (and system) 150 (e.g., local shearing and stitching) is also performed to create light fields 1006a-c that may correspond to input light fields 1002a-c. Even though shown separately in FIG. 10, global shearing (that results in global shearing output 1004a-c) may be included in some embodiments. For non-limiting example, some embodiments may have global shearing, local shearing, and stitching, resulting in output light fields 1006a-c. In FIG. 10, in order to further show the above-mentioned visual (e.g., image) effects, below each light field 1002a-c, 1004a-c, and 1006a-c, is a corresponding zoomed-in magnification (elements 1012a-c, 1014a-c, and 1016a-c, respectively), which is also represented as a first set of boxes (yellow boxes, 1012a, 1014a, 1016a), a second set of boxes (red boxes, 1012b, 1014b, 1016b), and a third set of boxes (blue boxes, 1012c, 1014c, 1016c), respectively.

Figure 12:
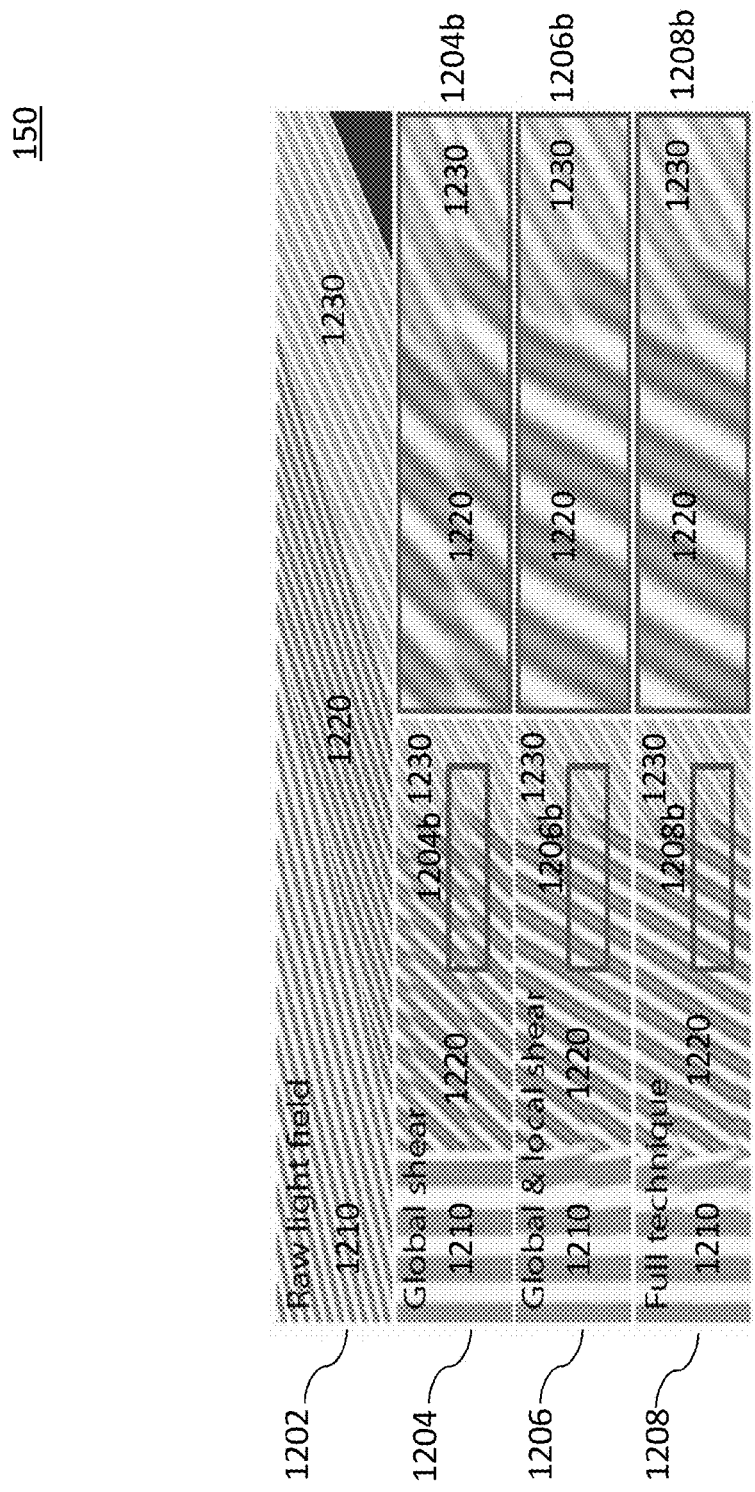
FIG. 12 is a diagram illustrating a raw light field and the results of a method employed by some embodiments.

FIG. 12 is a diagram illustrating an example embodiment of a raw light field 1202 and the results of the method (and system) 150 employed by some embodiments of the present invention. In some embodiments, processing a raw light field 1202 may include shearing globally 1204, also shearing locally 1206 (in addition to globally shearing 1204), and/or also including stitching 1208 (in addition to both global and local shearing 1206). Zoomed in representations of global shearing 1204, global and local shearing 1206, and global (and local) shearing combined with stitching 1208 are illustrated in FIG. 12 as 1204b, 1206b, 1208b, respectively.

Each representation of the light field may show the cumulative effects of global shearing 1204, then local shearing 1206, then stitching 1208, in order to reach the result of some embodiments. To further justify the role of shearing and stitching, FIG. 12 illustrates examples of some embodiments showing the results after each step. FIG. 12 demonstrates that each of these steps 1204, 1206, 1208 improves the continuity of the resulting light field. Some embodiments may not completely remove transitions because doing so may include flattening the scene. However, due to stitching across many views, the remaining transitions may be distributed across many frames, which may make them less apparent. Some embodiments may not display one or more views from the original light field on the screen because it may use some of them to perform overlap. To remedy this deficiency, some embodiments may employ view synthesis techniques that may be used to create additional views for the purpose of the overlap.

According to some embodiments, as illustrated in FIG. 12, the global shear 1204 of the original light field 1202 reduces excessive disparities and provides an improved alignment of the blue lines 1210 (to the left of each image 1204, 1206, 1208). As shown in FIG. 12, local shearing 1206 significantly improves the discontinuities between the red lines 1220 (in the middle of images 1204b, 1206b, 1208b). In some embodiments, this may be achieved by locally sacrificing the continuity of the blue lines 1210, which may not influence significantly the overall quality across the views. The complete technique 1208 may match the red lines 1220 and the orange lines 1230 to further improve the continuity between the replicas. In some embodiments, the Poisson reconstruction is applied in the above-mentioned examples in FIG. 12.

In some embodiments, the method (and system) 150 may be performed on a variety of light fields of images and/or videos. Compared to the original light field 1202, and to one where global shear is applied 1204, the full technique 1208 may provide smoother results. In many high frequency regions, the method (and system) 150 may find local repetitive structures, and eliminate one or more transitions. In some embodiments, the stitching may propagate transitions optimally into different views in different regions, making them less pronounced.

Figure 13:
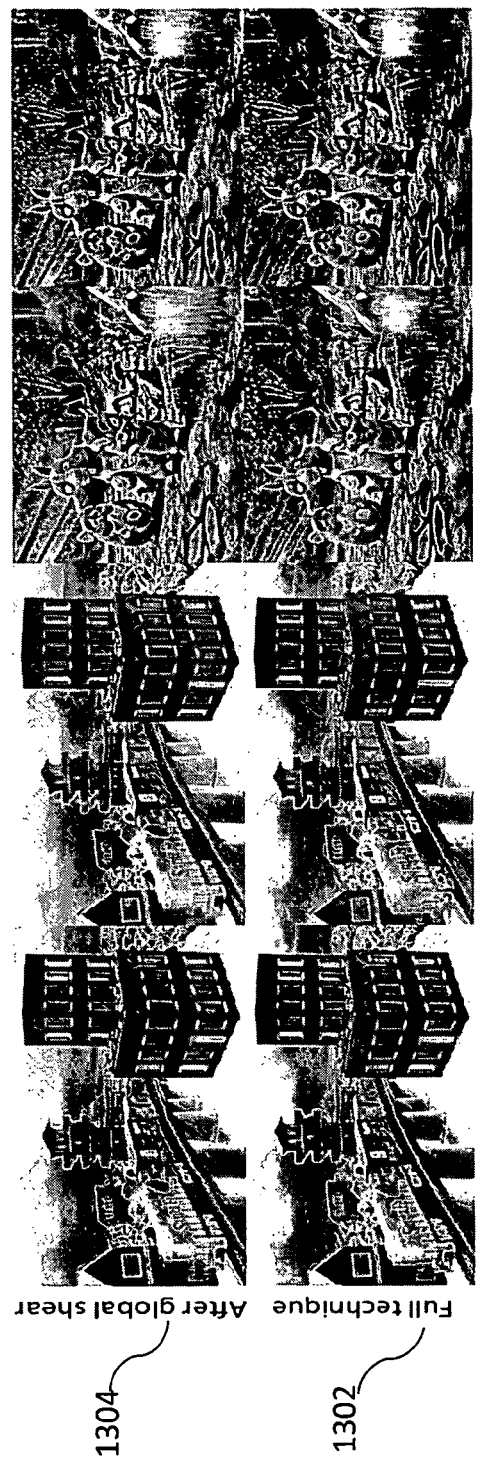
FIG. 13 illustrates a comparison of four views generated using a full method according to some embodiments, as compared against four corresponding views where global shear is applied ("Big Buck Bunny" © by Blender Foundation).

FIG. 13 illustrates a comparison of four views generated using a method (and system) 150 according to some embodiments, as compared against four corresponding views where global shear is applied. As such, FIG. 13 illustrates a comparison of four views generated using a global shearing method 1304 of some embodiments, as compared with four views generated using the full technique (global and local shearing combined with stitching) 1302 of some embodiments. According to some embodiments, the method (and system) 150 may apply the shear to align both light fields in the same way around the screen. According to some embodiments, the method (and system) 150 may provide smoother transitions with less discontinuity and depth reversal, and fewer diagonal strips.

According to some embodiments, processing one multi-view image composed of 100 views with a resolution of 1200×800 pixels in a non-optimized MATLAB implementation may take 1 minute (including 5 seconds for shearing and stitching and 55 seconds for Poisson reconstruction, in a non-limiting example). Currently, the Poisson reconstruction may be performed for each epipolar plane image separately. In some embodiments, processing 80 frames of a multi-view video in resolution 800×540 may take almost 1 hour, in which the bottleneck may be the Poisson reconstruction.

In some embodiments, the performance of the method (and system) 150 of the present invention is improved. Some embodiments may be highly parallelizable, e.g., every shot may be processed separately. Also, for slowly changing scenes, computation may be performed for fewer frames. As such, some embodiments alone, and/or in some embodiments combination with a GPU implementation, may reduce the computation time significantly.

Evaluation

In order to evaluate the quality improvement provided by some embodiments, user experiments are conducted that include a performance comparison of some embodiments, which include automatic global shear compared against manual adjustment done by users (FIG. 14), and then are evaluated (FIG. 15) using the full technique (e.g., global and local shearing combined with stitching) according to some embodiments. The following experiments include 16 participants with normal and/or corrected-to-normal vision without stereoblindness.

Manual Adjustment vs. Global Shear

Figure 14:
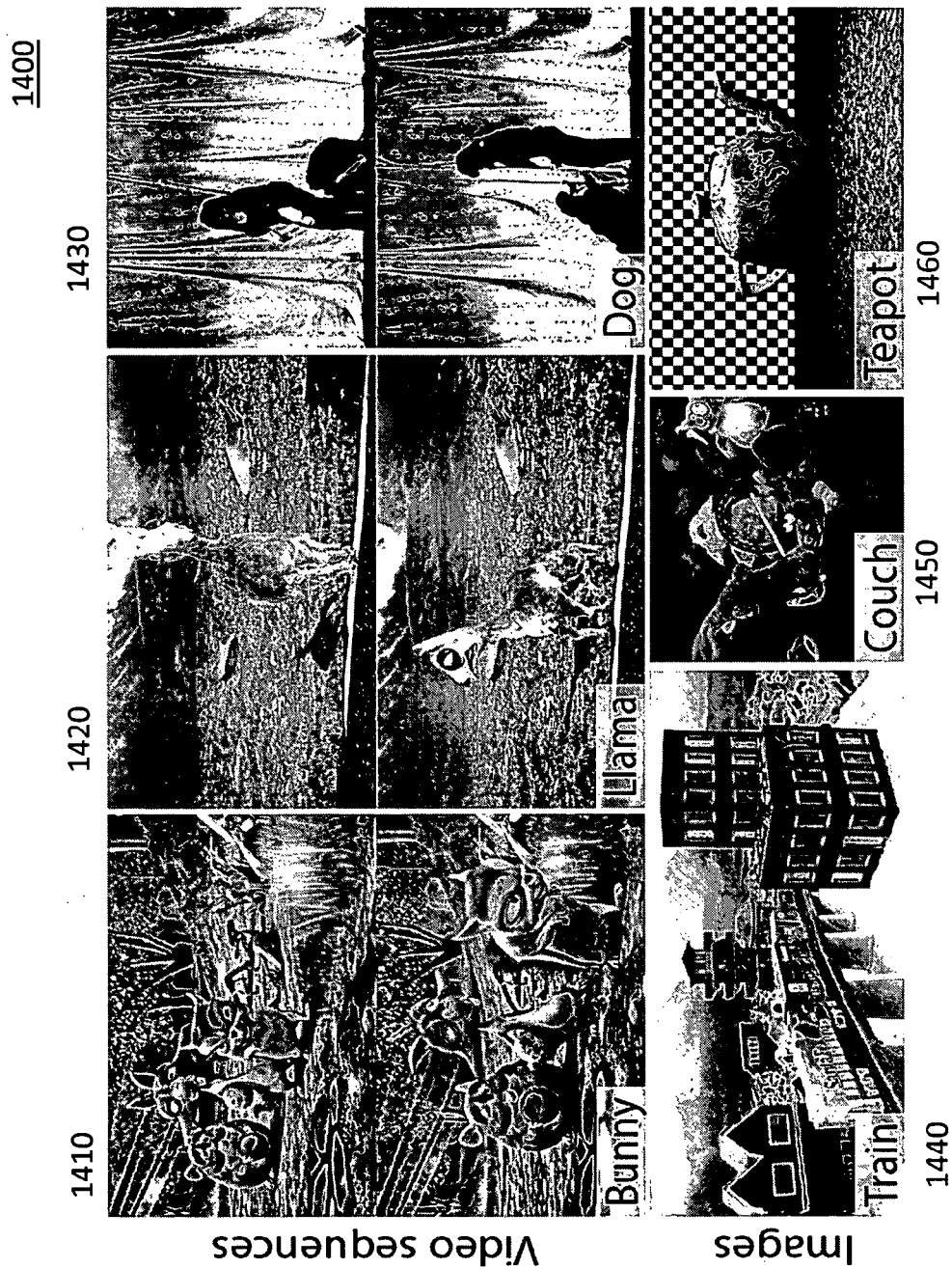
FIG. 14 illustrates example images used in user experiments, according to some embodiments ("Big Buck Bunny" © by Blender Foundation).

FIG. 14 includes illustrations 1400 of non-limiting examples from the experiment: "Couch" (element 1450) and "Train" (element 1440) are captured using a camera array, and "Bunny" (element 1410) and "Teapot" (element 1460) are rendered. In the experiment, each light field may include 100 views. User experiments may evaluate the quality improvement provided by the method (and system) 150 of the present invention, according to some embodiments. The 16 participants with normal or corrected-to-normal vision that are tested for stereoblindness are included in the experiment. Four different light fields of 100 (FIG. 14) are processed using some embodiments. Each stimuli presents to the participants two versions of the content produced by some embodiments: one with the full technique applied (global shearing, local shearing, and stitching) and the other with global shearing. While the shear is also a novel part of the method (and system) 150, it may be applied in the user test to make both stimuli comparable in terms of presented depth range.

The global shear may adjust the position of the entire scene with respect to the screen plane. A similar, manual correction is a common practice to reduce the need of inter-view antialiasing (see, Zwicker, M., Matusik, W., Durand, F., and Pfister, H., "Antialiasing for Automultiscopic 3D Displays," in *Proceedings of the 17th Eurographics Conference on Rendering Techniques*, Eurographics Association, 73-82, June 2006; and Didyk, P., Sitthi-Amorn, P., Freeman, W., Durand, F., and Matusik, W., "Joint View Expansion and Filtering for Automultiscopic 3D Displays," *ACM Trans. Graph* 32, 6, 221:1-221:8, November 2013, incorporated by reference herein in their entirety) and visual discomfort (see, Shibata, T., Kim J., Hoffman, D., and Banks, M., "The Zone of Comfort: Predicting Visual Discomfort with Stereo Displays," *Journal of Vision* 11, 8, 11:1-11:29, July 2011, incorporated by reference herein in its entirety). The global shear embodiment is compared to the manual correction technique. To acquire the optimal correction, three video sequences of FIG. 14 ("Bunny," element 1410, "Llama," element 1420, and "Dog," element 1430, respectively) are presented to each participant. As illustrated in the experiment, the sequence is displayed using a 42-inch 8-view automultiscopic NEWSIGHT JAPAN display. The participants are asked to sit 1.5 meters (1.5 m) away from the screen, which is preferably the optimal viewing distance for this display, and adjust the global depth of the scene until an improved (and/or the best) viewing quality is achieved. From collected data, the average adjustment for each scene is computed. The same content is processed using global shear. The resulting adjustments are compared with the results from the user study. The small differences and relatively high inter-subject variability (Table 1) suggest that the difference between the global shear and the manual adjustments is small. In some embodiments, the full technique (global shearing, local shearing, and stitching) is compared to the global shear as both of the embodiments provide an automatic solution.

Table 1 below illustrates statistics for the manual adjustment of the content. The Δ adjustment (in number of pixels, px) represents the difference between correction provided by an embodiment with global shear and manual adjustment provided by users. The difference is expressed as a change of the disparities between neighboring views and measured for Full high definition (HD) resolution. Additionally, standard deviation (σ) and standard error of the mean (SEM) are illustrated in Table 1.

TABLE 1

| Scene | Δ adjustment | σ | SEM |
| --- | --- | --- | --- |
| BUNNY | 0.5 px | 1.3 | 0.3 |
| LLAMA | −0.2 px | 0.7 | 0.17 |
| DOG | −0.32 px | 0.6 | 0.15 |

Global Shear vs. Full Technique

Figure 15:
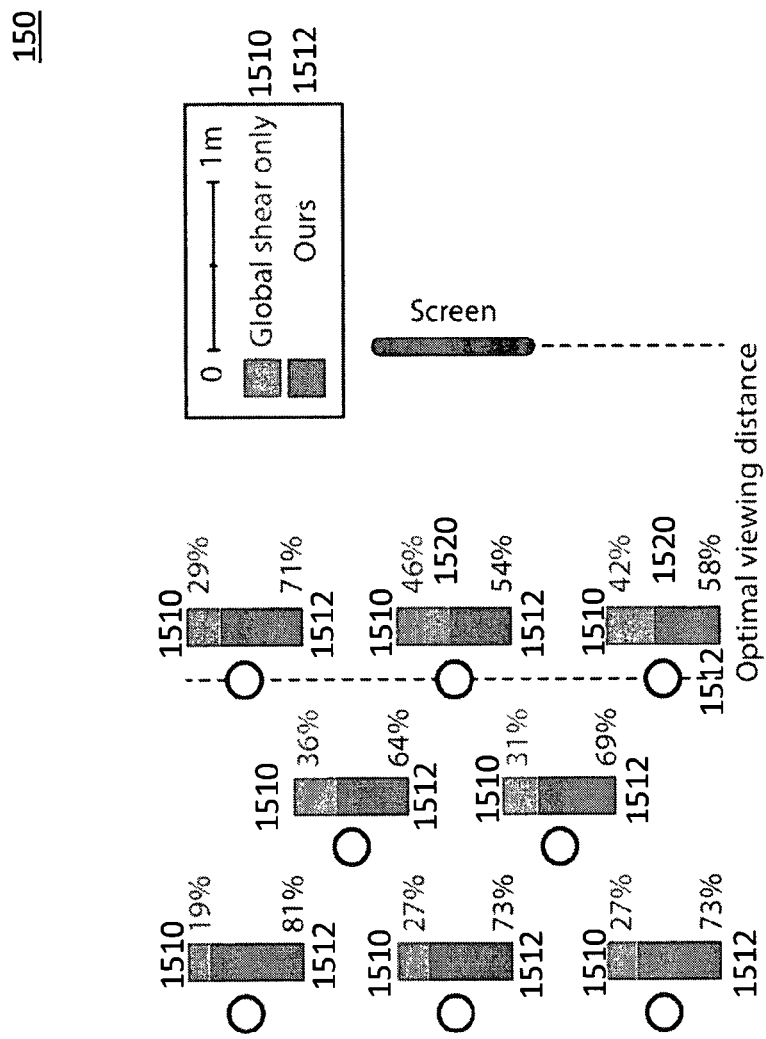
FIG. 15 is a graph illustrating results of viewer preferences for global shearing compared with viewer preferences for the full method (including global shearing, local shearing, and stitching), according to some embodiments.

Another experiment (results shown in FIG. 15), compares the results obtained using an embodiment that includes global shear against sequences produced using an embodiment having the full technique (global shearing, local shearing, and stitching) of the method (and system) 150 of the present invention. In order to evaluate how some embodiments perform for different viewing locations, 8 viewing positions are tested. In each trial, participants are asked to stay in one location which is marked on a floor. They are presented with both versions of the content, and may switch between them using a keyboard. The task for each participant is to judge which version of the content (e.g., the embodiment using global shear or the embodiment using the full method) provides an improved viewing experience. There are no other specific instructions provided to the observers. Each of the observers perform the task for each location and for the videos. The arrangement of the experiment and the results for the viewpoints are shown in FIG. 15. Although the participants are instructed to remain in the same locations, some of them may adjust their head position to find an improved viewing spot. The scenario of FIG. 15 may be considered as a common scenario for watching such image content.

FIG. 15 illustrates the corresponding results of this experiment for automultiscopic displays. The percentage values in FIG. 15 may correspond to the percentage of people who chose the full technique 1512 (including global shear, local shear, and stitching) and the content processed using global shear 1510. The places for which the results are not statistically significant are indicated 1520 in FIG. 15.

As illustrated in FIG. 15, in 68% of cases, particular sequences may be processed using the full technique (global shearing, local shearing, and stitching) of the method (and system) 150 of the present invention. This demonstrates that besides improving view transitions, some embodiments do not introduce temporal artifacts, thereby improving quality (e.g., including but not limited to avoiding quality reduction) of the content. To test significance of the results, a series of binomial tests are performed. The results are significant ($p<0.05$) except for two viewing positions located in the optimal distance from the screen. In this experiment, the views are affected by some embodiments. In some embodiments, displays having larger numbers of views may achieve improved image quality.

Figure 16:
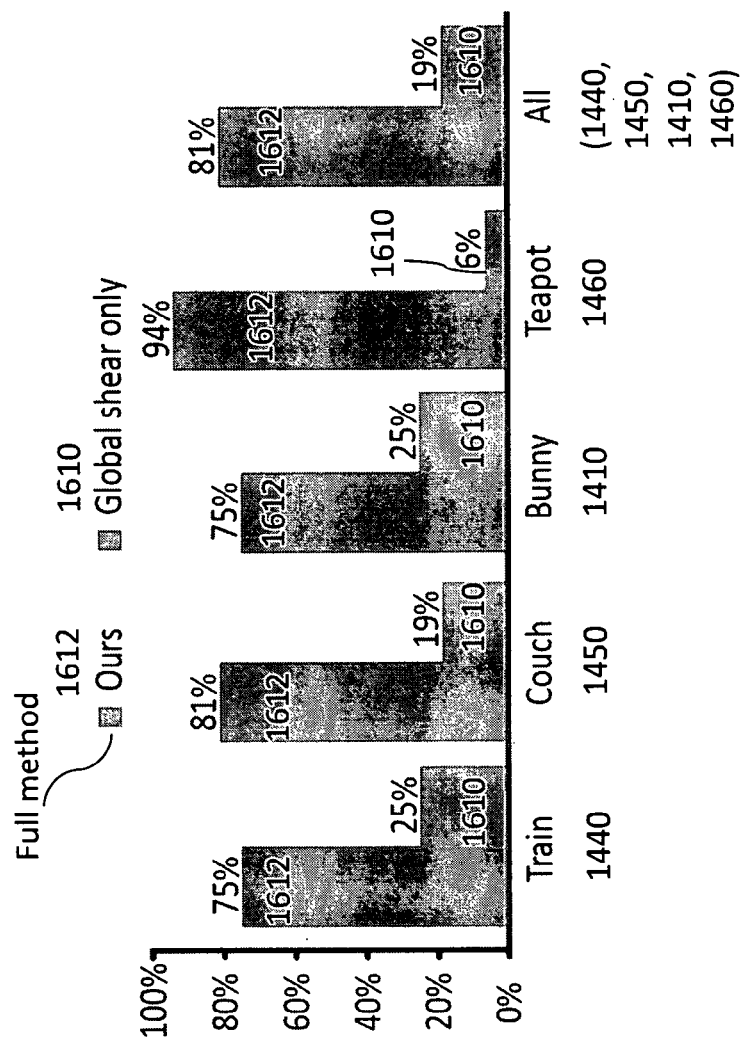
FIG. 16 is a graph further illustrating results of viewer preferences for global shearing compared with viewer preferences for the full method (including global shearing, local shearing, and stitching), according to some embodiments.

A similar experiment is shown in FIG. 16, with 4 different static light fields ("Train," element 1440, "Couch," element 1450, "Teapot," element 1460, and "Bunny," element 1410 of FIG. 14). As in the experiment of FIG. 15, each was prepared in two versions: one processed with the full technique that includes global and local shearing and stitching (element 1612), and the other with the global shear (element 1610) of the method (and system) 150 of the present invention, according to some embodiments. According to some embodiments, in the experiment of FIG. 14, next, both versions may be downsampled to 18 views, printed at 720 DPI and glued to lenticular sheets with 40 lenses per inch with a viewing angle of 25. For better comparison, both versions are printed on a single sheet. Additional sheets may be produced where the versions are swapped to provide a random order of methods. Next, each stimulus may be shown to every participant, who may be asked to perform free viewing (i.e., they may take each lenticular sheet and look at it from different angles and different distances). The participants are allowed to take as much time as they want to view the two versions of output images (1610 and 1612). Afterwards, the participants are asked to decide which of the versions provides an improved viewing experience without any further guidelines. FIG. 16 is a graph illustrating results of the above-mentioned experiment. In order to further validate that the results of this experiment are statistically significant, a binomial test is computed for each scene. For the examples the obtained p-value may be below 0.05, which confirms that some embodiments functionally improve the visual quality of images.

Some embodiments may also combine such manipulations with depth remapping methods and inter-view antialiasing. For real-time applications, such as games, this may improve the performance. Even without such depth remapping methods and inter-view anti-aliasing already has a wide range of applications, as it does not depend on a specific type of display device.

Further Discussion

Figure 17:
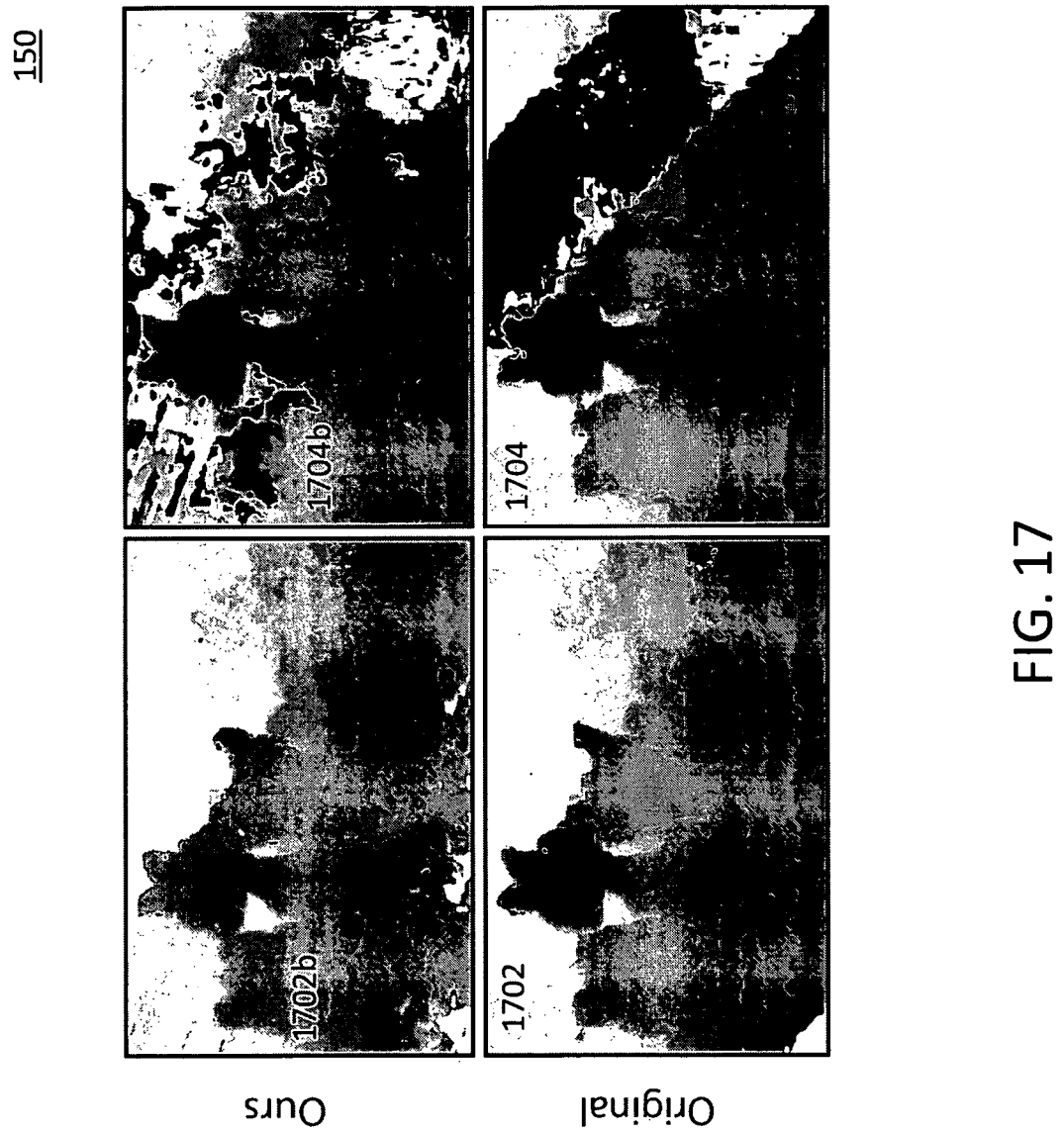
FIG. 17 illustrates images that are produced with a resulting depth which contains less depth errors than an original image, according to some embodiments ("Big Buck Bunny" © by Blender Foundation).

Some embodiments may take two or more steps to process the light field, including but not limited to shearing (global and/or local) and stitching. Referring back to FIG. 12, non-limiting example embodiments are provided. In some embodiments, due to stitching across many views (please refer to the above mentioned section titled "Light Field Stitching"), the remaining artifacts may be distributed across different views. In contrast to the original content, where transition areas may be large and may have apparent structure, the artifacts that remain after the techniques (1204, 1206, 1208) are applied may be small and local. To demonstrate this, in some embodiments an approach may be followed (Filippini, H. R., and Banks, M. S., "Limits of stereopsis explained by local cross-correlation," *Journal of Vision* 9(1), 8, 1-18, January 2009, which is incorporated by reference in its entirety herein) in that some stereoscopic effects may be explained by local crosscorrelation. Consequently, as illustrated in FIG. 17, this approach may be used in some embodiments to compute depth for sequences before (1702, 1704) and after (1702b, 1704b) the methods of the present invention are applied. Small reversals may be less objectionable. This may be explained by the fact that people may be less sensitive to high frequency depth variations.

As illustrated in FIG. 17, depth may be computed using cross correlation for two original views, and the same views processed using some embodiments. While the original content may produce pronounced depth reversals, some embodiments may provide views for which resulting depth may contain less structured depth errors.

Figure 18:
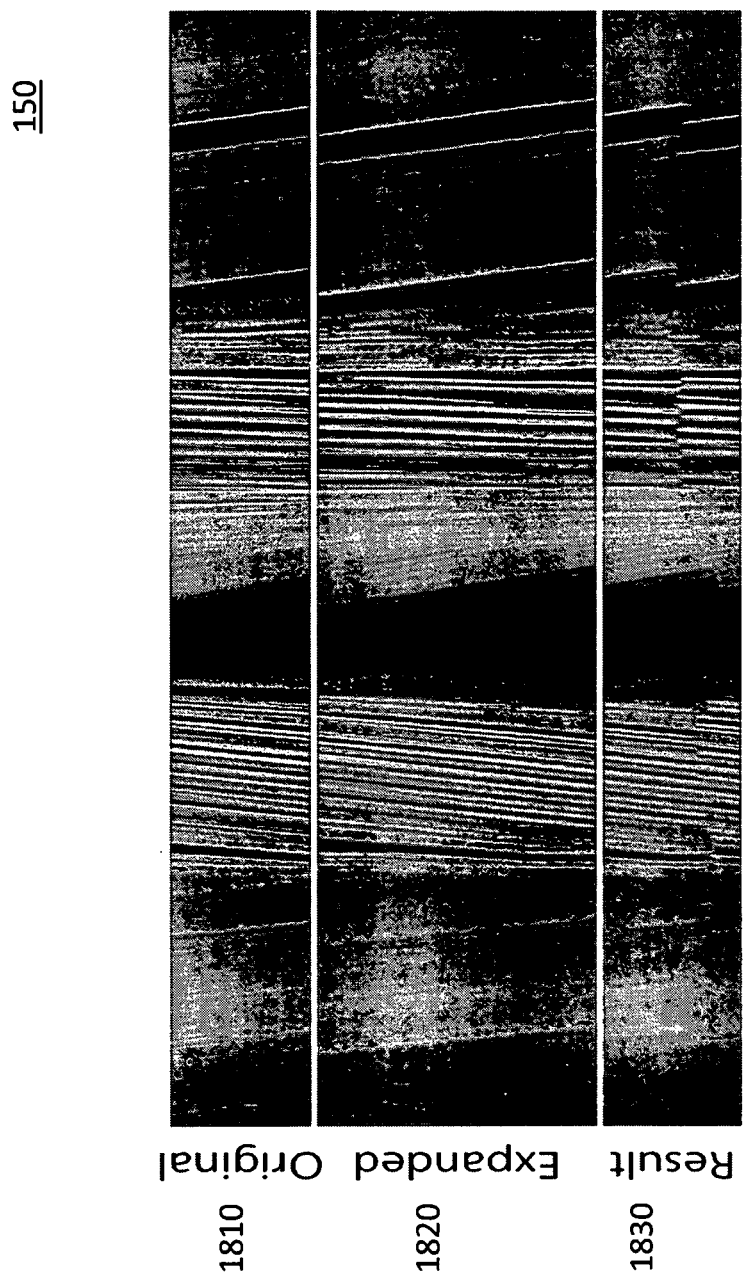
FIG. 18 is an illustration of view expansion according to some embodiments.

In some embodiments, distributing transitions across different views may affect the sweet-spot viewing. For displays with more views (e. g., Philips BDL2331VS/00 may include 28 views), the stitching may be performed on a small part of the light field near viewing zone boundaries. In non-limiting examples for $m=n/4$, the resulting light field may include ¾ of the views, and the stitching step may affect ¼ of the views. As a result, the content of ⅔ of the views shown on the screen may remain unchanged. To avoid limiting the number of input views that are shown on the screen, view synthesis techniques may be used to create additional views for the purpose of stitching (FIG. 18). Depending on the display (e.g., number of views) and the viewing conditions (e.g., range of viewing distances) different sets of views may be used. In some embodiments, in order to avoid performing expensive computation the display, several versions of the content may be prepared and delivered to the client. In the case of streaming systems, the correct version may be sent alone. Some embodiments may benefit from repetitive patterns, which are common in many image scenes, including but not limited to natural scenes such as trees, grass, ground, clouds and/or man-made image scenes.

In some embodiments, as illustrated in FIG. 18, the original light field 1810 (which may include 100 views) may be expanded 1820 (for non-limiting example, to 200 or more views) using image-based warping of the method (and system) 150 of the present invention. After stitching, the resulting light field 1830 may have the same number of views as the input content. Please refer to Applicant's Supplementary Video (which is incorporated by reference in its entirety herein, and available on the Internet at the "MIT CSAIL" website top level "people,", under the directory "pdidyk," followed by the sub-directory "projects," and the following sub-directory "MultiviewTransitions," as the file "MultiviewTransitions.avi," and also available at youtube under the title, "Improving Visual Quality of View Transitions in Automultiscopic Displays," September 2014). Please also refer to Applicant's Manuscript (Du, S.-P., Didyk, P., Durand, F., Hu, Shi-Min, and Matusik, W., "Improving Visual Quality of View Transitions in Automultiscopic Displays," *Journal of ACM Transactions on Graphics*, Vol. 33, Issue 6, Article No. 192, November 2014, which is incorporated by reference in its entirety herein).

Referring back to FIG. 10, an embodiment that uses local shearing may find improved matches and improve the quality of the light field. Some embodiments may reduce the transitions problem by placing these objects close to the screen plane, which is also desirable for eye strain reduction.

The performance of some embodiments is demonstrated on static images as well as videos, and validated in user experiments. Additional advantage of some embodiments is device-independence and view-independence, e.g., some embodiments may not require information about display type and/or viewers' positions. These together with the fact that it is a purely software solution make some embodiments desirable as a pre-processing step for a wide range of applications. Some embodiments may include a full-parallax display, which is an exciting avenue and a non-trivial problem. First, in some embodiments, the analysis of the problem may be extended from 2D EPI images to 3D. Then, some embodiments may enforce the repetitive structure in both horizontal and vertical directions. Some embodiments may not apply directly to multi-layer displays; however, some embodiments may be used to expand their field of view. Other embodiments may combine such manipulations with depth remapping methods and interview antialiasing as well as to improve performance for real-time applications. Some embodiments are beneficial not only for 3DTV applications and 3D visualizations, but also for large scale projector-based cinema systems.

Figure 19:
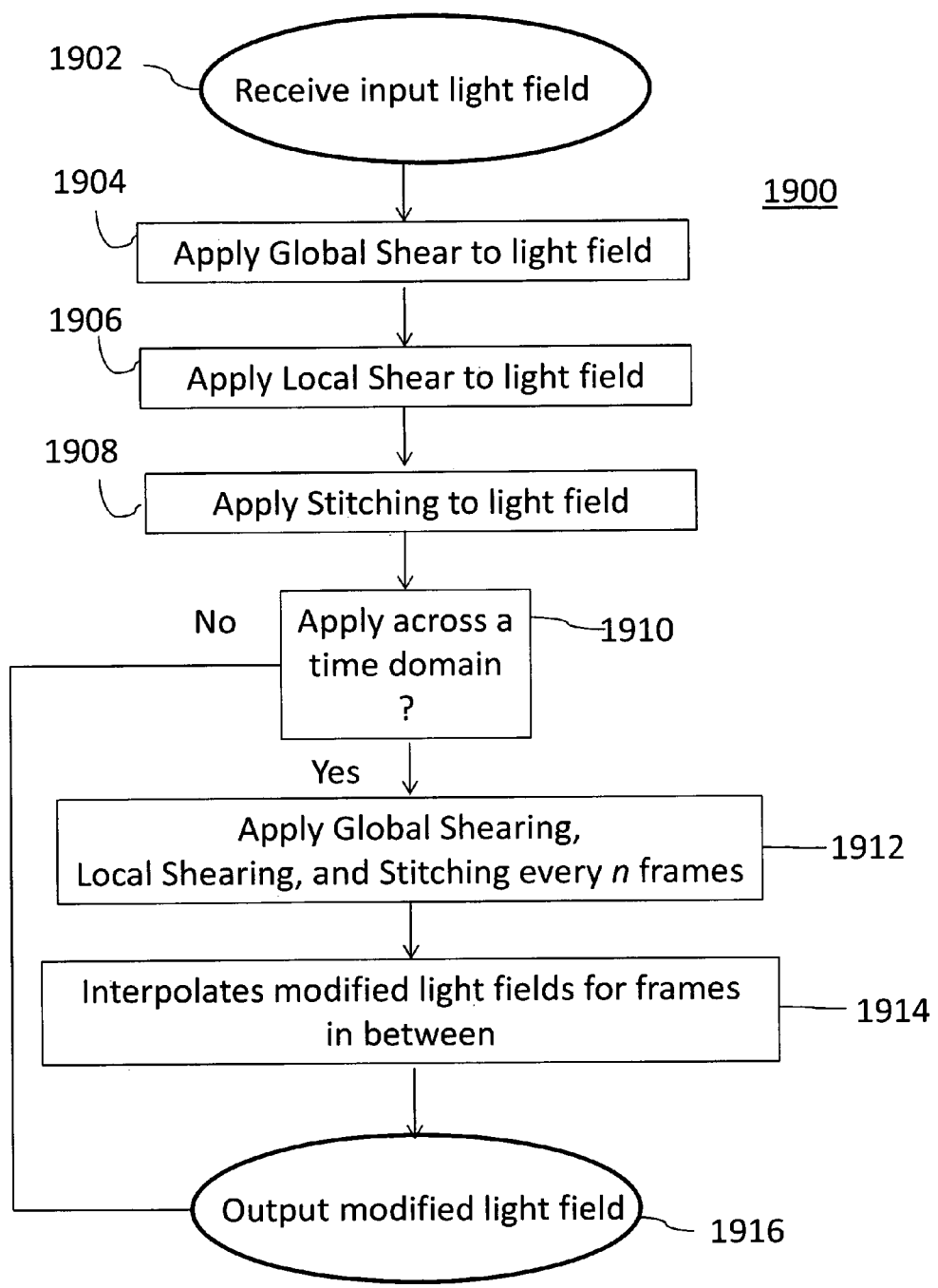
FIG. 19 is a flow diagram illustrating a process employed by some embodiments.

FIG. 19 is a flow diagram illustrating a process 1900 employed by some embodiments that include the method (and system) 150 of the present invention. The process 1900 may begin by receiving an input light field (1902). The process 1900 then may apply a global shear to the light field (1904). The shear may change (e.g., adjust) the slope of one or more lines associated with the input light field (1902), which is another way to express that the shear may also change the depth of the scene. The process 1900 then may apply a local shear to the light field (1906). The process 1900 may perform the local shear by dividing the light field into a grid, and applying local shears to each portion of the grid. The process 1900 then may apply stitching to the light field (1908).

The process 1900 then may determine whether it should apply changes to the input light field across a time domain (1910). In other words, the process 1900 may determine whether the input is a video or a still picture. If the input is a across a time domain (a video), the process 1900 may apply global shearing, local shearing and stitching as described above to every n-th frame of the video (1912). Depending on the processing power available, n may be set to a number equal to and/or greater than 1, where setting n=1 may perform the process 1900 on each of the frames and may perform no interpolation. Then, the process may interpolate modified light fields for the frames in between every n-th frame (1914). The process then may output a modified light field (1916). If the process determines that it should not apply changes to the input across a time domain (1910), then it may output the modified light field (1916).

Figure 20:
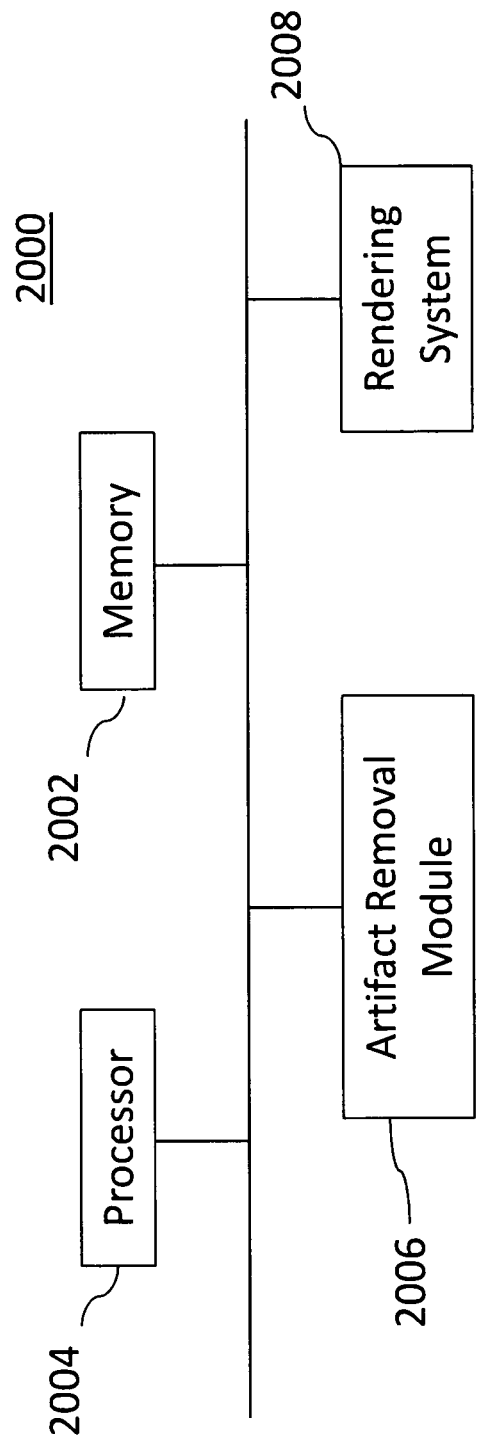
FIG. 20 is a block diagram, according to some embodiments of the present invention.

FIG. 20 is a block diagram 2000 illustrating an example embodiment of the present invention. A memory 2002 and processor 2004 may be operatively coupled with an artifact removal module 2006. The artifact removal module 2006 may be configured to remove one or more artifacts from the multi-view content by modifying the multi-view content. The artifact removal module 2006 is programmed and/or otherwise configured to execute the process 1900 of FIG. 19 described in detail above. The memory 2002, processor 2004 and artifact removal module 2006 may also be coupled with a rendering system 2008. The rendering system 2008 may be configured to render the multi-view content at a display or print the multi-view content for use with a lenticular sheet, for non-limiting example.

Figure 21:
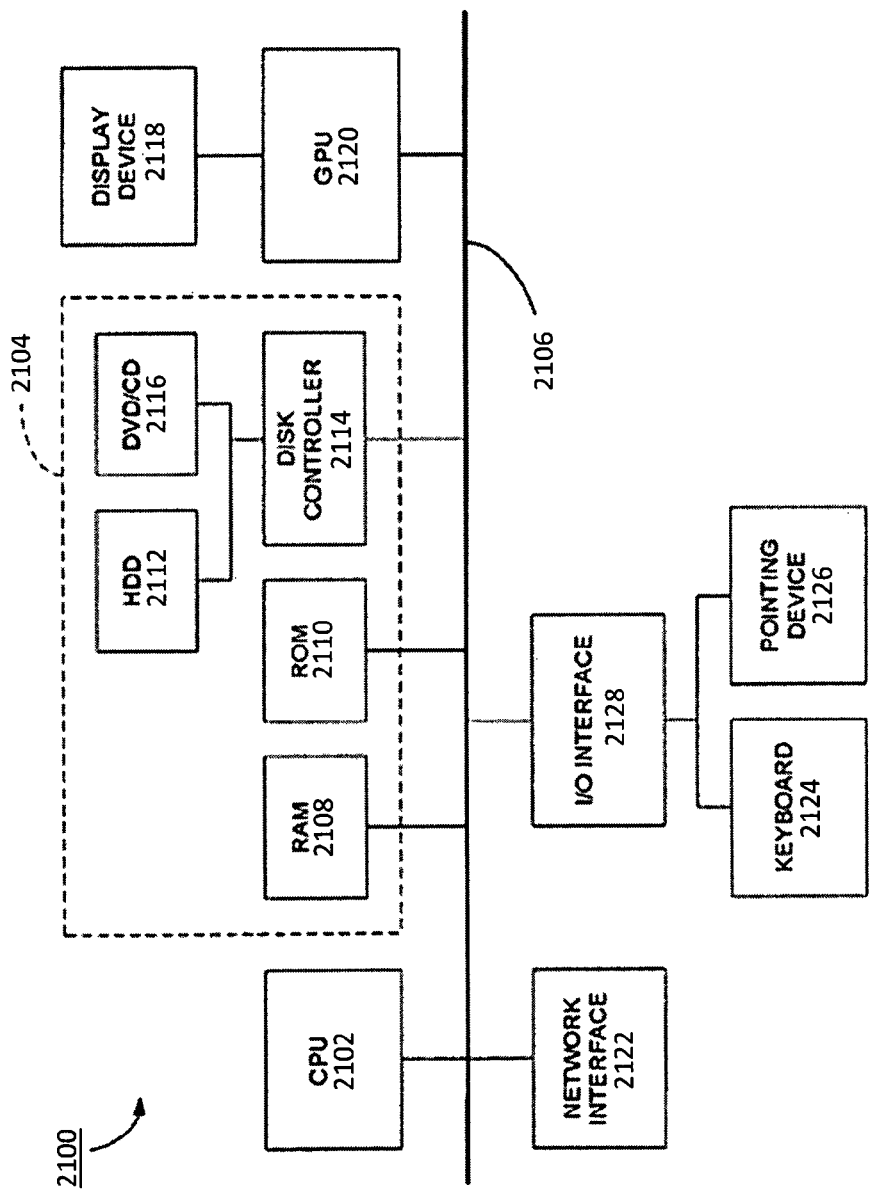
FIG. 21 is a detailed block diagram, according to some embodiments of the present invention.

FIG. 21 is a high-level block diagram 2100 of an embodiment of the present invention method (and system) 150 that may remove artifacts from an input image frame (and/or input image sequence and/or input image light field) according to the principles of the present invention. The computer-based system 2100 contains a bus 2106. The bus 2106 is a connection between the various components of the system 2100. Connected to the bus 2106 is an input/output device interface 2128 for connecting various input and output devices, such as a keypad, controller unit, keyboard (generally 2124), mouse/pointing device 2126, display, speakers, touchscreen display (generally display device 2118), etc. to the system 2100. According to some embodiments of the present invention, the input/output device interface 2128 provides an interface for allowing a user to select image (and/or video) display parameters and aspects using any method as is known in the art.

A central processing unit (CPU) 2102 is connected to the bus 2106 and provides for the execution of computer instructions such as those of artifact removal module 2006 and process 1900 discussed above. Memory 2110 provides volatile storage for data used for carrying out computer instructions. Storage or RAM 2108 provides nonvolatile storage for software instructions such as an operating system. The system 2100 also comprises a network interface 2122, for connecting to any variety of networks, including wide area networks (WANs), local area networks (LANs), wireless networks, mobile device networks, cable data networks and so on.

In particular the steps of the processes described above and/or any additional processes that may be related to those described above may be stored as computer executable instructions in, for example a memory area 2104 that is operably and/or communicatively coupled to the processor 2102 and to a GPU 2120 by a system bus 2106 or similar supporting data communication line. A "memory area" as used herein, refers generally to any means of storing program code and instructions executable by one or more processors to aid in storing multi-view image content in an electronic memory, removing one or more artifacts from the multi-view image content, and/or modifying the multi-view image content including shearing the multi-view image content globally, shearing the multi-view image content locally, and/or stitching the multi-view image content. The instructions executable by one or more processors, based upon the modification of the multi-view image content, may provide one or more updated multi-view images in which the one or more artifacts are removed and/or reduced in visibility.

The memory area 2104 may include one, or more than one, form of memory. For example the memory area 2104 may include random access memory (RAM) 2108, which may include non-volatile RAM, magnetic RAM, ferroelectric RAM, and/or other forms of RAM. The memory area 2104 may also include read-only memory (ROM) 2110 and/or flash memory and/or electrically erasable programmable read-only memory (EEPROM). Any other suitable magnetic, optical and/or semiconductor memory, such as a hard disk drive (HDD) 2112, by itself or in combination with other forms of memory, may be included in the memory area 2104. HDD 2112 may be coupled to a disk controller 2114 for use in transmitting and receiving messages to and from processor 2102. Moreover the memory area 2104 may also be or may include a detachable or removable memory 2116 such as a suitable cartridge disk, CD-ROM, DVD, or USB memory. The memory area 2104 may in some embodiments effectively include cloud computing memory accessible through network interface 2122, and the like. The above examples are exemplary only, and thus, are not intended to limit in any way the definition and/or meaning of the term "memory area."

In some embodiments, a CPU 2102 sends a stream of two-dimensional (2D) and/or three-dimensional (3D) video images (including, but not limited to the three dimensions of an x-axis, a y-axis, and time) to GPU 2120 via a system bus 2106 or other communications coupling. GPU 2120 employs the above-described methods, algorithms and computer-based techniques as programmed in memory area 2104 to generate images exhibiting removed and/or reduced artifacts for display on display device 2118. The GPU 2120 forms a picture of the screen image and stores it in a frame buffer. This picture is a large bitmap used to continually update and drive the screen image on display device 2118. Although the preferred embodiment sends a stream of two-dimensional (2D) video images to the GPU 2120, one skilled in the art realizes that embodiments may include a stream of three-dimensional and/or four-dimensional video images (including, but not limited to three dimensions including an x-axis, a y-axis, and time, or four dimensions including a x-axis, y-axis, z-axis, and time).

The display device 2118 may be, without limitation, a monitor, a television display, a plasma display, a liquid crystal display (LCD), a display based on light emitting diodes (LED), a display based on organic LEDs (OLEDs), a display based on polymer LEDs, a display based on surface-conduction electron emitters, a display including a projected and/or reflected image, or any other suitable electronic device or display mechanism. Moreover, the display device 2118 may include a touchscreen with an associated touchscreen controller. The above examples are exemplary only, and thus, are not intended to limit in any way the definition and/or meaning of the term "display device."

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

For non-limiting example, artifacts may be referred to as visual artifacts and/or image artifacts. For non-limiting example, a scene (and/or image scene) may include a screen (including but not limited to an embedded screen) which may be referred to as a display screen and/or image screen. For non-limiting example, a pixel may refer to an image pixel. For non-limiting example, multi-view image content may be referred to as a multi-view image and/or one or more multi-view images.

What is claimed is:

1. A computer-implemented method comprising:
storing multi-view automultiscopic image content of a multi-view image including an image scene or two-dimensional slice in an electronic memory;
reducing the visibility of one or more artifacts from the multi-view automultiscopic image content by modifying the multi-view automultiscopic image content based upon shearing the multi-view automultiscopic image content globally, followed by shearing the multi-view automultiscopic image content locally, the local shearing further reducing the visibility of the one or more artifacts as compared with the global shearing, and followed by stitching of repeated fragments of the multi-view automultiscopic image content, the stitching including determining an optimal stitch cut in a gradient domain based upon overlapping repeated fragments of the multi-view automultiscopic image content, the stitching performing a further additional reduction of the visibility of the one or more artifacts as compared with the local shearing; and
based upon the modification of the multi-view automultiscopic image content, providing one or more updated multi-view images with improved visibility as compared with the multi-view image, at least with respect to the one or more artifacts.

2. The method of claim 1, wherein:
the multi-view automultiscopic image content includes the image scene; and
shearing the multi-view automultiscopic image content globally includes repositioning the image scene along a depth plane.

3. The method of claim 2, wherein repositioning the image scene includes adjusting a slope of one or more lines that pass through an intersection of a line corresponding to a given point in the image scene.

4. The method of claim 1, wherein shearing the multi-view automultiscopic image content locally includes:
dividing the multi-view automultiscopic image content into a plurality of portions of the multi-view automultiscopic image content, and
repositioning a plurality of views of each of the portions of the multi-view automultiscopic image content.

5. The method of claim 1, wherein stitching the multi-view automultiscopic image content includes propagating shears of the multi-view automultiscopic image content into the multi-view image using linear interpolation and presenting objects of the multi-view automultiscopic image content at different depths with different viewing locations.

6. The method of claim 1, wherein the multi-view automultiscopic image content includes multi-view frames across a time domain.

7. The method of claim 6, further comprising:
periodically selecting a sample of multi-view frames from the time domain;
periodically performing reducing the visibility of the one or more artifacts from the sample of multi-view frames by modifying the multi-view automultiscopic image content; and
periodically performing reducing the visibility of the one or more artifacts from non-selected multi-view frames by interpolating the shearing of the multi-view automultiscopic image content locally and interpolating the shearing of the multi-view automultiscopic image content globally.

8. The method of claim 1, wherein the global shearing is performed based upon first and last views of the multi-view automultiscopic image content, a total number of pixels of the multi-view image, and a matching error between a neighborhood of a given pixel of the first view and a neighborhood of a corresponding pixel of the last view.

9. A system comprising:
a memory storing multi-view automultiscopic image content of a multi-view image including an image scene or two-dimensional slice;
an artifact removal module configured to reduce the visibility of one or more artifacts from the multi-view automultiscopic image content by modifying the multi-view automultiscopic image content based upon shearing the multi-view automultiscopic image content globally, followed by shearing the multi-view automultiscopic image content locally, the local shearing further reducing the visibility of the one or more artifacts as compared with the global shearing, and followed by stitching of repeated fragments of the multi-view automultiscopic image content, the stitching including determining an optimal stitch cut in a gradient domain based upon overlapping repeated fragments of the multi-view automultiscopic image content, the stitching performing a further additional reduction of the visibility of the one or more artifacts as compared with the local shearing; and
the artifact removal module, based upon the modification of the multi-view automultiscopic image content, being further configured to provide one or more updated multi-view images with improved visibility as compared with the multi-view image, at least with respect to the one or more artifacts.

10. The system of claim 9, wherein the multi-view automultiscopic image content includes the image scene, and shearing the multi-view automultiscopic image content globally includes repositioning the image scene along a depth plane.

11. The system of claim 10, wherein repositioning the image scene includes adjusting a slope of one or more lines that pass through an intersection of a line corresponding to a given point in the image scene.

12. The system of claim 9, wherein shearing the multi-view automultiscopic image content locally includes:
a) dividing the multi-view automultiscopic image content into a plurality of portions of the multi-view automultiscopic image content, and
b) repositioning a plurality of views of each of the portions of the multi-view automultiscopic image content.

13. The system of claim 9, wherein stitching the multi-view automultiscopic image content includes propagating shears of the multi-view automultiscopic image content into the multi-view image using linear interpolation and presenting objects of the multi-view automultiscopic image content at different depths with different viewing locations.

14. The system of claim 9, wherein the multi-view automultiscopic image content includes multi-view frames across a time domain.

15. The system of claim 14, further comprising:
a selection module configured to periodically select a sample of multi-view frames from the time domain;
wherein the artifact removal module is configured to periodically reduce the visibility of the one or more artifacts from the sample of multi-view frames by modifying the multi-view automultiscopic image content and is configured to periodically reduce the visibility of the one or more artifacts from non-selected multi-view frames by interpolating the shearing of the multi-view automultiscopic image content locally and interpolating the shearing of the multi-view automultiscopic image content globally.

16. A non-transitory computer readable medium having stored thereon a sequence of instructions which, when loaded and executed by a processor coupled to an apparatus, causes the apparatus to:
store multi-view automultiscopic image content including an image scene or two-dimensional slice;
reduce the visibility of one or more artifacts from the multi-view automultiscopic image content by modifying the multi-view automultiscopic image content based upon shearing the multi-view automultiscopic image content globally, followed by shearing the multi-view automultiscopic image content locally, the local shearing further reducing the visibility of the one or more artifacts as compared with the global shearing, and followed by stitching of repeated fragments of the multi-view automultiscopic image content, the stitching including determining an optimal stitch cut in a gradient domain based upon overlapping repeated fragments of the multi-view automultiscopic image content, the stitching performing a further additional reduction of the visibility of the one or more artifacts as compared with the local shearing; and
provide one or more updated multi-view images, based upon the modification of the multi-view automultiscopic image content, with improved visibility as compared with the multi-view image, at least with respect to the one or more artifacts.

17. The apparatus of claim 16, the instructions further causing the apparatus to shear the multi-view automultiscopic image content globally including.

18. The apparatus of claim 17, the instructions further causing the apparatus to reposition the plurality of views of the multi-view automultiscopic image content including adjusting a slope of one or more lines that pass through an intersection of a line corresponding to a given point in the image scene.

* * * * *